US012768272B2

(12) United States Patent
Webb

(10) Patent No.: US 12,768,272 B2
(45) Date of Patent: Oct. 20, 2026

(54) CONTINUOUS ACTUATOR DRIVEN MATERIAL HANDLING SYSTEM FOR VERTICAL AND INCLINED SHAFTS

(71) Applicant: NORDIC MINESTEEL TECHNOLOGIES INC., North Bay (CA)

(72) Inventor: Rocky Lynn Webb, North Bay (CA)

(73) Assignee: NORDIC MINESTEEL TECHNOLOGIES INC., North Bay (CA)

( * ) Notice: Subject to any disclaimer, the term of this patent is extended or adjusted under 35 U.S.C. 154(b) by 105 days.

(21) Appl. No.: 18/843,809

(22) PCT Filed: Mar. 9, 2023

(86) PCT No.: PCT/CA2023/050314
§ 371 (c)(1),
(2) Date: Sep. 4, 2024

(87) PCT Pub. No.: WO2023/168530
PCT Pub. Date: Sep. 14, 2023

(65) Prior Publication Data

US 2025/0188840 A1 Jun. 12, 2025

Related U.S. Application Data

(60) Provisional application No. 63/318,367, filed on Mar. 9, 2022.

(51) Int. Cl.
*E21F 13/04* (2006.01)
*B65G 35/06* (2006.01)

(52) U.S. Cl.
CPC .............. *E21F 13/04* (2013.01); *B65G 35/06* (2013.01); *B65G 2201/045* (2013.01)

(58) Field of Classification Search
None
See application file for complete search history.

(56) References Cited

FOREIGN PATENT DOCUMENTS

| | | |
|---|---|---|
| JP | 2000045328 A | 2/2000 |
| JP | 2002284329 A | 10/2002 |

(Continued)

OTHER PUBLICATIONS

International Searching Authority (ISA/CA), International Search Report and Written Opinion, mailed May 18, 2023, for related International Patent Application No. PCT/CA2023/050314.

(Continued)

*Primary Examiner* — Kavel Singh
(74) *Attorney, Agent, or Firm* — CONNEELY PC; Joseph Conneely

(57) ABSTRACT

A continuous actuator driven material handling system for raising and lowering bins in a vertical or inclined shaft, comprising: a first pair of actuator assemblies, each of the first pair of actuator assemblies configured to alternately raise a first bin by increments; a second pair of actuators assemblies, each of the second pair of actuator assemblies configured to alternately lower a second bin by increments; a further plurality of first pairs of actuator assemblies mounted on a wall of the shaft to thereby successively raise the first bin up the shaft; and, a further plurality of second pairs of actuator assemblies mounted on the wall of the shaft to thereby successively lower the second bin down the shaft.

13 Claims, 16 Drawing Sheets

(56) References Cited

FOREIGN PATENT DOCUMENTS

| | | | |
|---|---|---|---|
| JP | 4228255 B2 | | 2/2009 |
| JP | 4374510 B2 | * | 12/2009 |

OTHER PUBLICATIONS

European Patent Office (EPO), Extended European Search Report, mailed Apr. 29, 2025, for related European Patent Application No. 23765639.2.

* cited by examiner

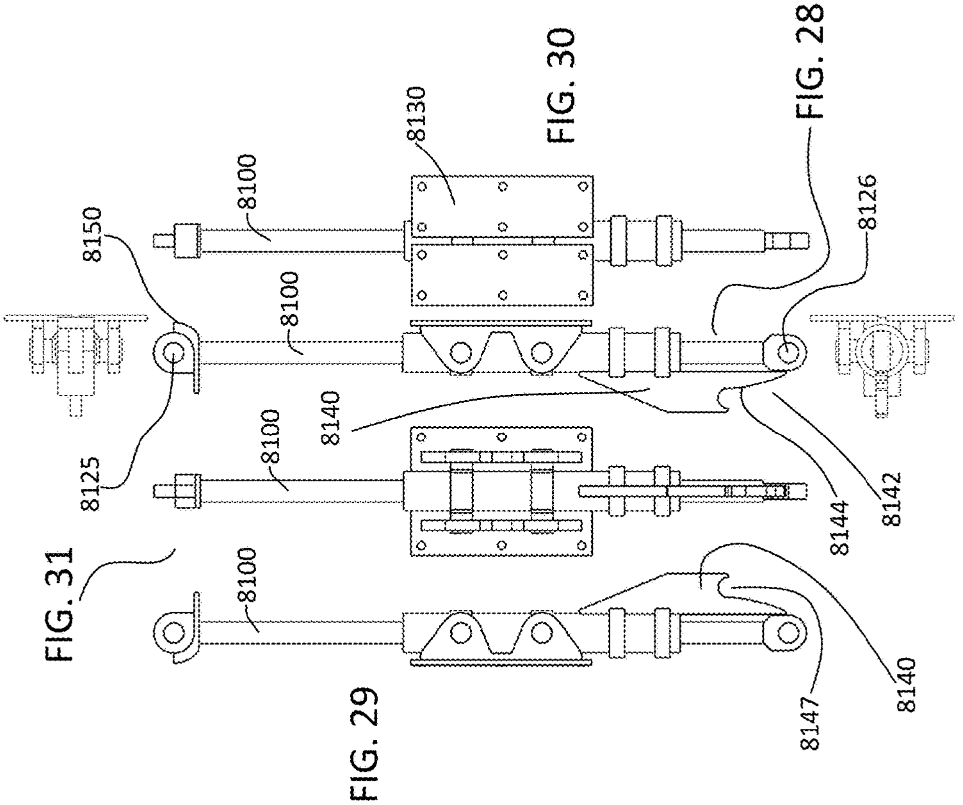
FIG. 30
FIG. 28
FIG. 32
FIG. 33
FIG. 31
FIG. 29
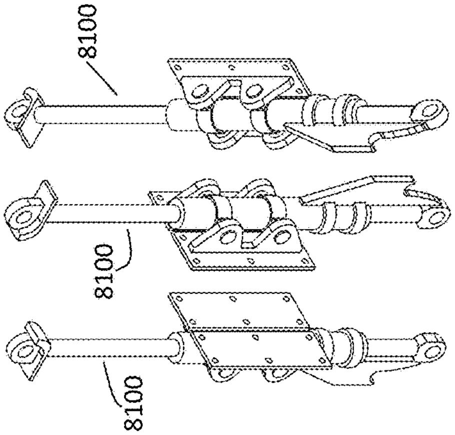
FIG. 25
FIG. 26
FIG. 27

CONTINUOUS ACTUATOR DRIVEN MATERIAL HANDLING SYSTEM FOR VERTICAL AND INCLINED SHAFTS

This application claims priority from and the benefit of the filing date of U.S. Provisional Patent Application No. 63/318,367, filed Mar. 9, 2022, and the entire content of such application is incorporated herein by reference, and is a national phase entry of International Patent Application No. PCT/CA2023/050314, filed Mar. 9, 2023, and the entire content of such application is incorporated herein by reference.

FIELD OF THE APPLICATION

This application relates to the field of beltless and cableless conveyor systems, lifts, or elevators for mining, and more specifically, to a continuous actuator driven material handling system for raising and lowering bins in vertical or inclined shafts.

BACKGROUND

Current vertical pocket style conveyor systems used for underground mining have several disadvantages. For example, they typically have limited single lift hoisting depth capability of up to a maximum of approximately 700 m, noting that very few mines are under 500 m deep. Much as the rope strength can limit a hoist, belt strength can limit the depth capabilities of vertical conveyors as can belt slippage at drive due to the increased weight of the belt as mine depths increase.

In addition, the volume and size of material that current systems can handle is quite small. Typically, vertical conveyor systems have “pockets” attached to a belt (in various ways) and these pockets are typically small in volume. As such, material to be transported must be crushed to a very small grain size. In addition, current systems cannot typically handle run of mine muck or primary crusher material that would pass through a traditional 16 inch by 18 inch rock screen.

Belt maintenance is another problem with current vertical conveyor systems. Oversize muck, tramp steel, etc., can easily damage the belt or tear off a pocket causing downtime and costly repair. In addition, the belts are unsupported in the shaft and are only supported at the head pulley on the surface. If a belt fails, it would typically fall down the shaft as there is typically nothing in the shaft to catch broken belts. The belts used are generally quite expensive as well and when they break they can cause costly and substantial down time. In addition, belt replacement is a complex process and surface infrastructure (e.g., head drive, support steel, etc.) is typically substantial A need therefore exists for an improved material handling system for vertical and inclined shafts in mining operations and the like. Accordingly, a solution that addresses, at least in part, the above and other shortcomings is desired.

SUMMARY OF THE APPLICATION

According to one aspect of the application, there is provided a continuous actuator driven material handling system for raising and lowering bins in a vertical or inclined shaft, comprising: a first pair of actuator assemblies, each of the first pair of actuator assemblies configured to alternately raise a first bin by an increment, a first actuator assembly of the first pair raising the first bin by the increment before handing the first bin off to a second actuator assembly of the first pair, the second actuator assembly of the first pair raising the first bin by the increment before handing the first bin back to the first actuator assembly of the first pair; a second pair of actuators assemblies, each of the second pair of actuator assemblies configured to alternately lower a second bin by the increment, a first actuator assembly of the second pair lowering the second bin by the increment before handing the second bin off to a second actuator assembly of the second pair, the second actuator assembly of the second pair lowering the second bin by the increment before handing the second bin back to the first actuator assembly of the second pair; a further plurality of first pairs of actuator assemblies mounted on a wall of the shaft to thereby successively raise the first bin up the shaft; and, a further plurality of second pairs of actuator assemblies mounted on the wall of the shaft to thereby successively lower the second bin down the shaft.

BRIEF DESCRIPTION OF THE DRAWINGS

Features and advantages of the embodiments of the present application will become apparent from the following detailed description, taken in combination with the appended drawings, in which:

FIG. 25 is a bottom left side perspective view illustrating the double rod actuator assembly of FIG. 23 with the lifting and lowering links removed in accordance with an embodiment of the application;

FIG. 26 is top left side perspective view thereof;
FIG. 27 is a right side perspective view thereof;
FIG. 28 is a front view thereof;
FIG. 29 is a rear view thereof;
FIG. 30 is a right side view thereof;
FIG. 31 is a left side view thereof;
FIG. 32 is a top view thereof;
FIG. 33 is a bottom view thereof.

It will be noted that throughout the appended drawings, like features are identified by like reference numerals.

DETAILED DESCRIPTION OF THE EMBODIMENTS

In the following description, details are set forth to provide an understanding of the application. In some instances, certain structures, techniques and methods have not been described or shown in detail in order not to obscure the application.

The present application provides a continuous actuator driven material handling system (or "system") 100, 1000 for raising and lowering bins 200 in vertical or inclined shafts 300, 400. The bins 200 may be used to carry ore, "muck", or other material between levels or to the surface of an underground mine. The system 100, 1000 may also be used in above ground mining applications (e.g., open pits with vertical or inclined sides, etc.) and in non-mining applications such as in manufacturing plants, storage facilities, etc.

Figures 1, 2, 3, 4:
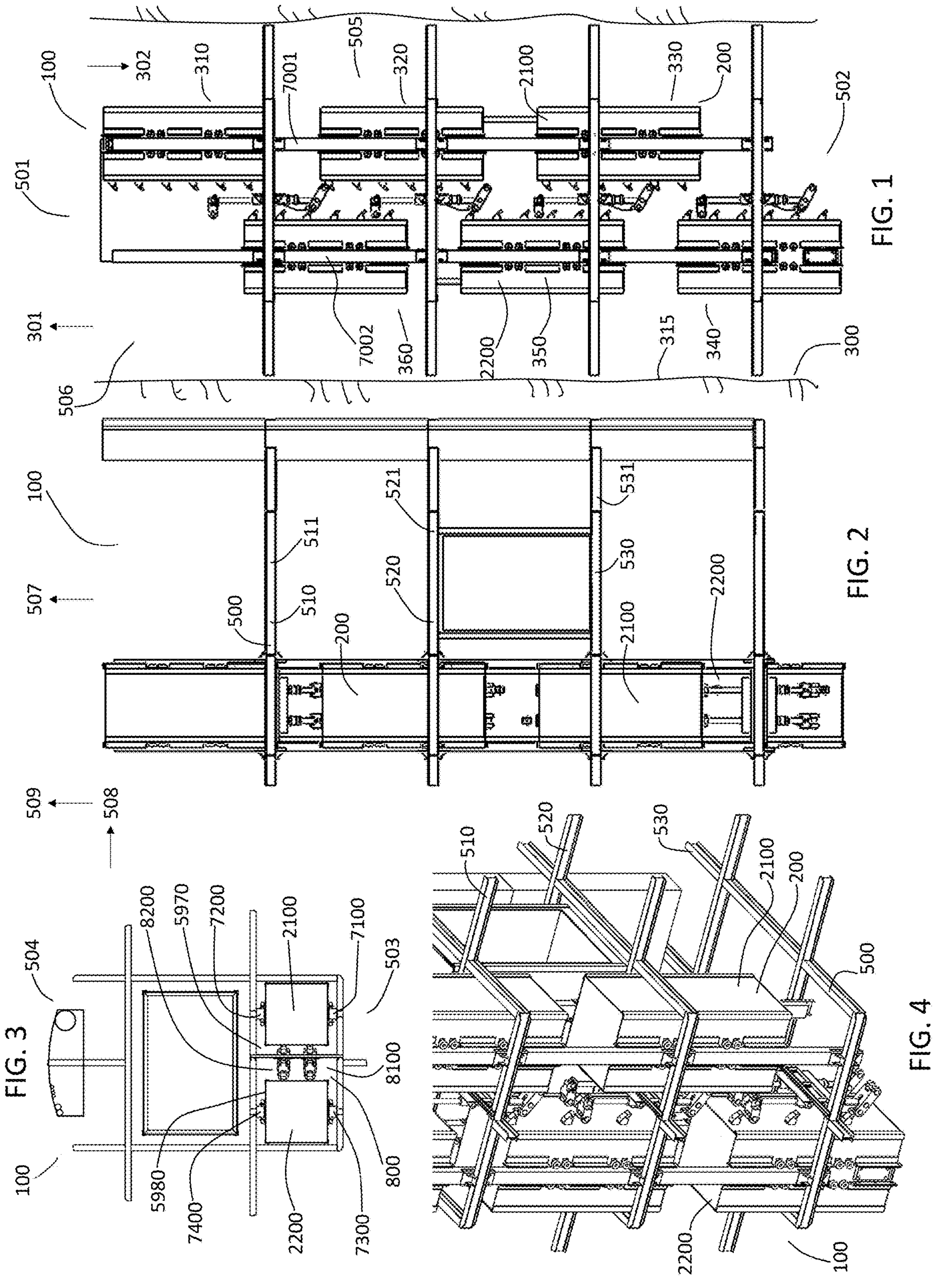
FIG. 1 is a front view illustrating a continuous actuator driven material handling system positioned in a vertical shaft in accordance with an embodiment of the application.
FIG. 2 is a right side view thereof.
FIG. 3 is a top view thereof.
FIG. 4 is a front perspective detail view illustrating the system of FIG. 1 in accordance with an embodiment of the application.
Figure 73:
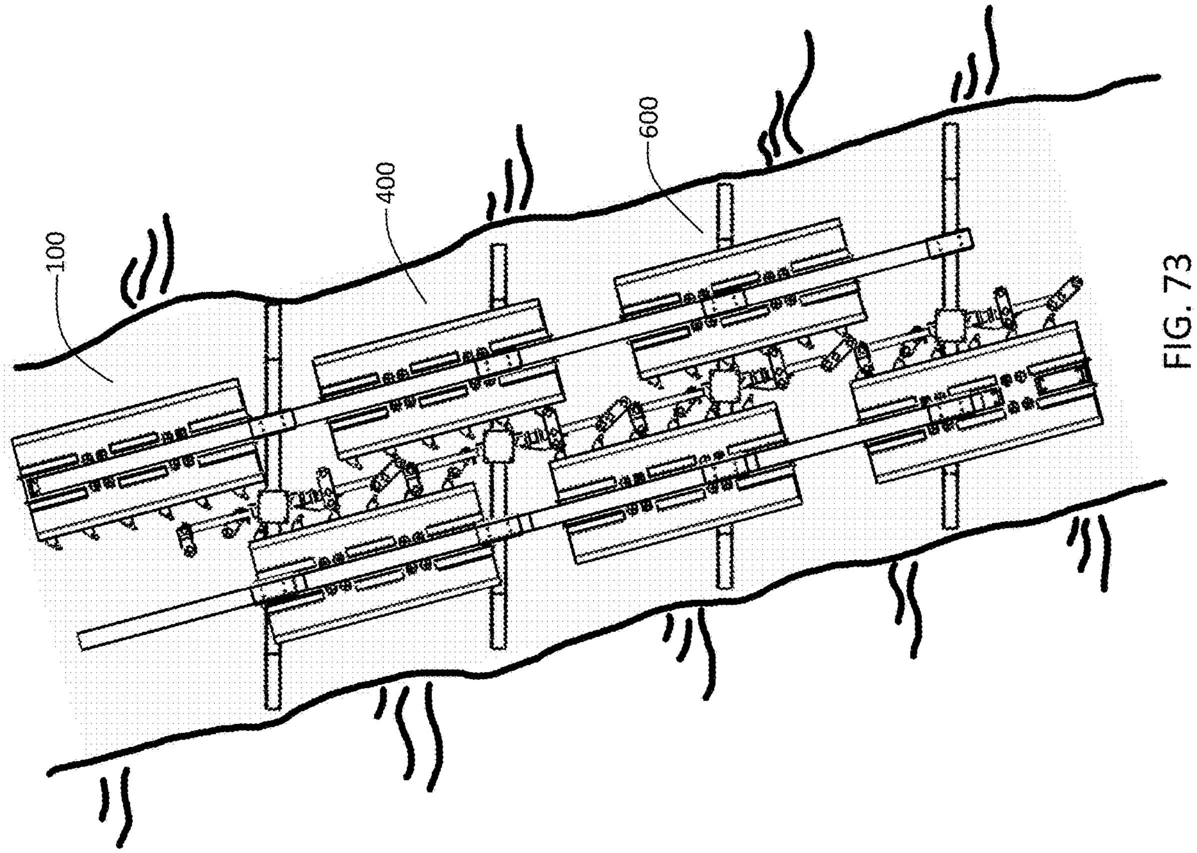

FIG. 1 is a front view illustrating a continuous actuator driven material handling system (or "system") 100 positioned in a vertical shaft 300 in accordance with an embodiment of the application. FIG. 2 is a right side view thereof. FIG. 3 is a top view thereof. FIG. 4 is a front perspective detail view illustrating the system 100 of FIG. 1 in accordance with an embodiment of the application. And, FIG. 73 is a front view illustrating a continuous actuator driven material handling system 100 positioned in an inclined shaft 400 in accordance with an embodiment of the application.

As will be further described below, the system 100 includes: a structural support system 500, 600 for installation in the vertical or inclined shaft 300, 400; a plurality of bins 200 for carrying material; a plurality of pairs 800 of double rod actuator assemblies 8100, 8200 attached to the structural support system 500 for raising and lowering the bins 200; and, a control system 10000 for controlling and monitoring operations of the continuous actuator driven material handling system 100.

Figure 5:
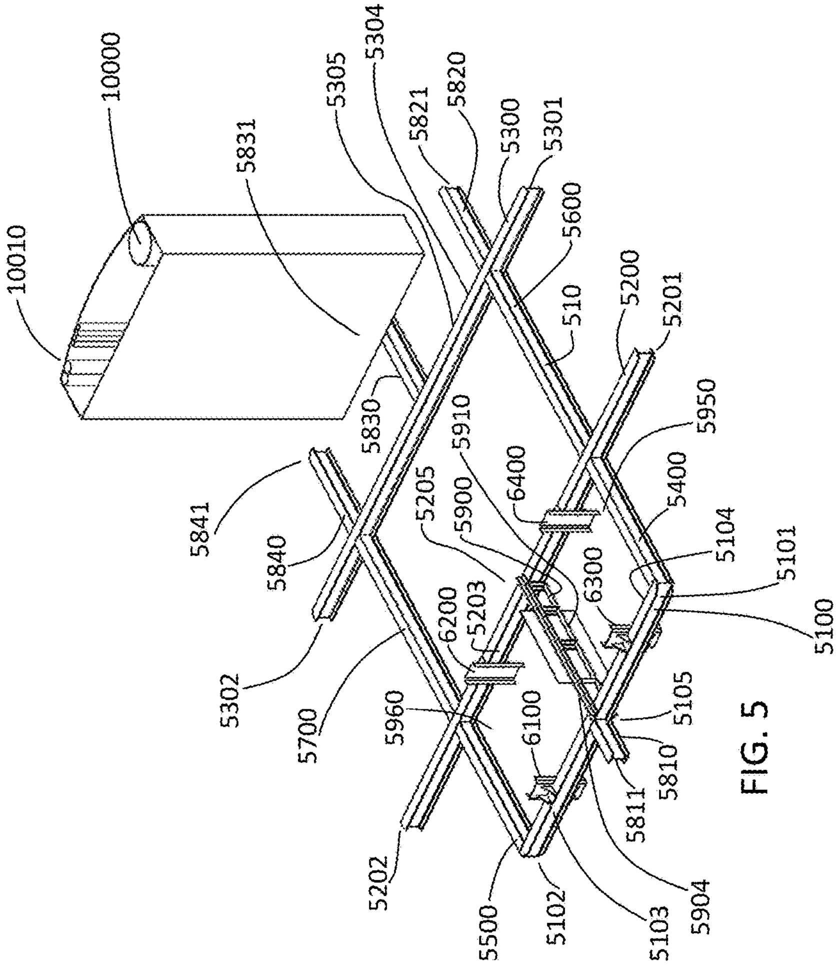
FIG. 5 is a front perspective detail view illustrating a shaft steel set of the system of FIG. 1 in accordance with an embodiment of the application.
Figure 6:
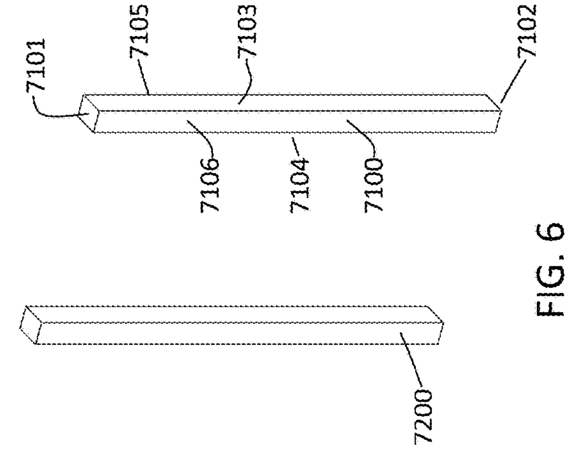
FIG. 6 is a front perspective detail view illustrating first and second guides of the system of FIG. 1 in accordance with an embodiment of the application.

FIG. 5 is a front perspective detail view illustrating a shaft steel set 510 of the structural support system 500 of the system 100 of FIG. 1 in accordance with an embodiment of the application. And, FIG. 6 is a front perspective detail view illustrating first and second guides 7100, 7200 of the structural support system 500 of the system 100 of FIG. 1 in accordance with an embodiment of the application.

According to one embodiment, the structural support system 500 (i.e., for a vertical shaft 300) includes a plurality of spaced shaft steel sets 510, 520, 530. The spacing or vertical distance between shaft steel sets (e.g., 510, 520) may be adjusted to suit the dimensions of the shaft 300, the sizing of bins 200, etc. Each shaft steel set (e.g., 510) may include first, second, and third parallel (or approximately parallel) and spaced lateral girders (or beams or I-beams) 5100, 5200, 5300. The first and second lateral girders are attached (e.g., one or more of attached, connected, joined, bolted, welded, screwed, coupled, pinned, hinged, etc.) by first and second parallel (or approximately parallel) and spaced longitudinal girders 5400, 5500. Similarly, the second and third lateral girders 5200, 5300 are third attached by and forth parallel (or approximately parallel) and spaced longitudinal girders 5600, 5700. A first longitudinal mounting girder 5810 may be attached to the front (or outer) side 5103 of the first lateral girder 5100 proximate a midpoint 5105 thereof between first (or right) 5101 and second (or left) ends 5102 thereof. Similarly, second, third, and fourth longitudinal mounting girders 5820, 5830, 5840 may be attached to the rear (or outer) side 5304 of the third lateral girder 5300 proximate a first end 5301, a second end 5302, and a midpoint 5305 thereof. The outer ends 5811, 5821, 5831, 5841 of the first, second, third, and fourth longitudinal mounting girders 5810, 5820, 5830, 5840 and the ends 5201, 5202, 5301, 5302 of the second and third lateral girders 5200, 5300 may be attached to the wall(s) 315 of the shaft 300.

A longitudinal cylinder mounting beam (or girder) 5900 is attached between the first and second lateral girders 5100, 5200 on their respective rear and front sides 5104, 5203 proximate their midpoints 5105, 5205. The second (or left) side 5904 of the cylinder mounting beam 5900 has a cylinder mounting bracket 5910 (e.g., a substantially rectangle plate, etc.) attached thereto for mounting first (or front) and second (or rear) double rod actuator assemblies 8100, 8200 thereto as will be further described below. Pairs of first and second (or front and rear) guide mounting brackets 6100, 6200, 6300, 6400 are attached to the rear and front sides 5104, 5203 of the first and second lateral girders 5100, 5200 on either side of the cylinder mounting beam 5900. Each guide mounting bracket (e.g., 6100) may have a vertical C-channel shape.

Each shaft steel set 510, 520, 530 defines a level or nominal level 511, 521, 531 of the structural support system 500. The structural support system 500 (and the shaft 300 and each shaft steel set 510, 520, 530) has a top 501, a bottom 502, a front side 503, a rear side 504, a first (or right) side 505, a second (or left) side 506, a vertical axis (z-axis) 507, a lateral axis (x-axis) 508, and a longitudinal (y-axis) 509. These directions and axes may be used to describe other components (e.g., the shaft 300, 400, etc.) of the system 100 in the following as well.

Adjacent shaft steel sets (e.g., 510, 520) are attached by respective first and second pairs 7001, 7002 of first (or front) and second (or rear) guides 7100, 7200, 7300, 7400. Each guide (e.g., 7100) has a top end, side, or surface 7101, a bottom end, side, or surface 7102, a front side 7103, a rear side 7104, a first (or right) side 7105, and a second (or left) side 7106. The first and second pairs of guides 7100, 7200, 7300, 7400 are attached to respective first and second pairs of guide mounting brackets 6100, 6200, 6300, 6400 of adjacent shaft steel sets 510, 520. For example, the front side 7103 of a first guide 7100 proximate the top end 7101 thereof may be attached to the front guide mounting bracket 6100 of a first or upper level shaft steel set 510 while the front side 7103 of the first guide 7100 proximate the bottom end 7102 thereof may be attached to the front guide mounting bracket 6100 of a second or lower lever shaft steel set 520.

The cylinder mounting beam 5900, the first lateral girder 5100, the second lateral girder 5200, and the first (or right) longitudinal girder 5400 define a first (or right) opening 5950 in the shaft steel set 510. Similarly, the cylinder mounting beam 5900, the first lateral girder 5100, the second lateral girder 5200, and the second (or left) longitudinal girder 5500 define a second (or left) opening 5960 in the shaft steel set 510. Respective first and second openings 5950, 5960 in adjacent, attached, and vertically aligned shaft steel sets 510, 520, 530 define first (or right) and second (or left) bin shafts 5970, 5980 of the structural support system 500 allowing bins 200 (e.g., 2100, 2200) to travel therethrough between levels 511, 521, 531 of the structural support system 500 and hence up and down the shaft 300.

Figures 7, 8, 9, 10, 11, 12, 13, 14:
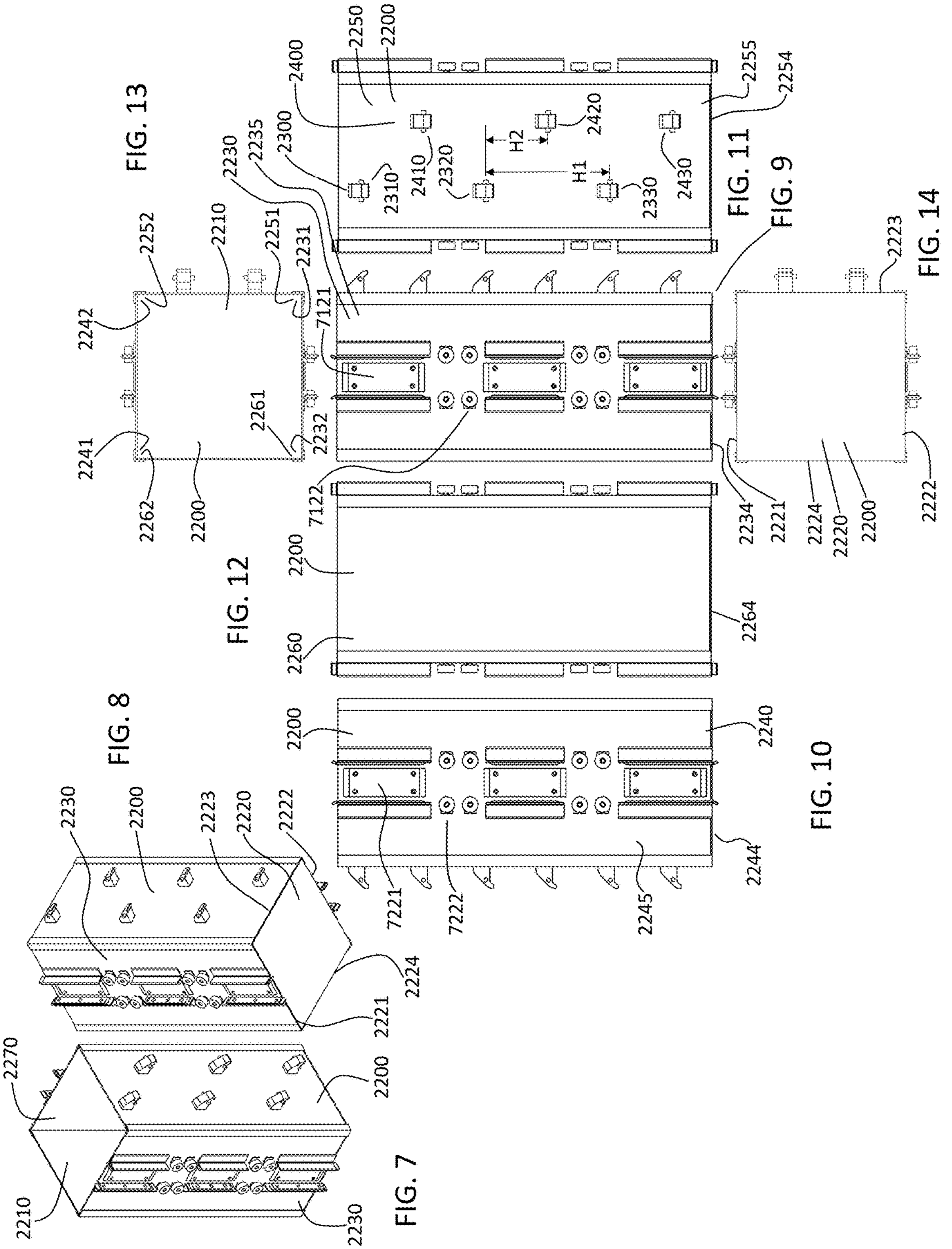
FIG. 7 is a top front perspective view illustrating a bin of the system of FIG. 1 in accordance with an embodiment of the application.
FIG. 8 is a bottom front perspective view thereof.
FIG. 9 is front view thereof.
FIG. 10 is rear view thereof.
FIG. 11 is a first (or right) side view thereof.
FIG. 12 is a second (or left) side view thereof.
FIG. 13 is a top view thereof.
FIG. 14 is a bottom view thereof.

FIG. 7 is a top front perspective view illustrating a bin 2200 of the system 100 of FIG. 1 in accordance with an embodiment of the application. FIG. 8 is a bottom front perspective view thereof. FIG. 9 is front view thereof. FIG. 10 is rear view thereof. FIG. 11 is a first (or right) side view thereof. FIG. 12 is a second (or left) side view thereof. FIG. 13 is a top view thereof. And, FIG. 14 is a bottom view thereof.

Each bin (e.g., 2200) includes an open top 2210, a closed bottom or bottom surface or base 2220, a front side or wall 2230, a rear side or wall 2240, a first (or right) side or wall 2250, and, a second (or left) side or wall 2260. The first side 2250 of a first bin (e.g., 2200) faces the cylinder mounting beam 5900 when the bin 2200 is travelling in an upward direction 301 through the second (or left) bin shaft (e.g., 5980). Similarly, the first side 2250 of a second bin (e.g., 2100) faces the cylinder mounting beam 5900 when the bin 2100 is travelling in a downward direction 302 though the first (or right) bin shaft (e.g., 5970). Of course, either bin shaft 5970, 5980 may be used for upward or downward travel 301, 302 of bins 2100, 2200 by suitable rearrangement of the double rod actuator assemblies 8100, 8200.

The open top 2210 of the bin 2200 is for accessing the inside 2270 of the bin 2200 for receiving and unloading material from the bin 2200. According to one embodiment, the open top 2210 may be provided with a cover or lid.

The first (or right) and second (or left) edges 2231, 2232 of the front wall 2230 are attached to respective front edges 2251, 2261 of the first and second side walls 2250, 2260. The first (or right) and second (or left) edges 2241, 2242 of the rear wall 2240 are attached to respective rear edges 2252, 2262 of the first and second side walls 2250, 2260. And, the front, rear, first (or right) side, and second (or left) side edges 2221, 2222, 2223, 2224 of the bottom 2220 are attached to respective bottom edges 2234, 2244, 2254, 2264 of the front, back, first side, and second side walls 2230, 2240, 2250, 2260.

The outer surfaces 2235, 2245 of the front and rear walls 2230, 2240 of each bin 2200 have mounted thereon one or more respective guide shoes 7121, 7221 and guide rollers 7122, 7222 for engaging respective guides (e.g., 7300, 7400) of the structural support system 500. These guide shoes 7121, 7122 and guide rollers 7221, 7222 maintain positioning, stability, and smooth operation of the bin 2200 during travel within the bin shaft (e.g., 5980).

The outer surface 2255 of the first (or right) wall 2250 of each bin 2200 has mounted thereon first (or front) and second (or rear) columns 2300, 2400 of bin lugs 2310, 2320, 2330, 2410, 2420, 2430. The bin lugs (e.g., 2310, 2320, 2330) in each column (e.g., 2300) are spaced apart vertically (i.e., with respect to the bin 2200) by a height H1. The columns 2300, 2400 are spaced apart horizontally by a width W. And, respective bin lugs (e.g., 2320, 2420) in each column 2300, 2400 are offset vertically by a height (or increment) H2. According to one embodiment, the height (or increment) between bin lugs H2 is one half of the height H1.

Figure 15:
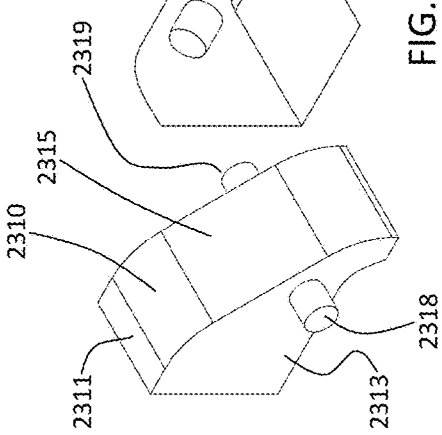
FIG. 15 is a top front perspective view illustrating a bin lug of the bin of FIG. 7 in accordance with an embodiment of the application.
Figure 16:
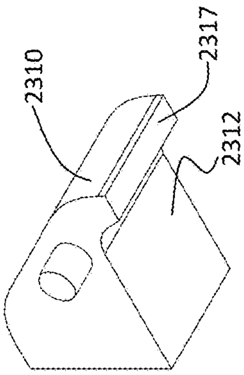
FIG. 16 is a bottom front perspective view thereof.
Figure 17:
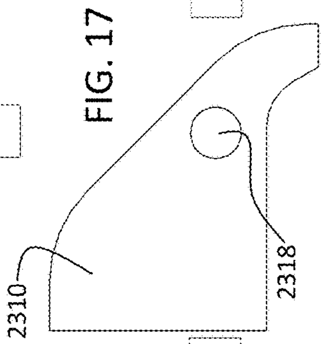
FIG. 17 is front view thereof.
Figure 18:
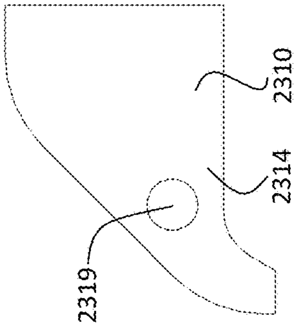
FIG. 18 is rear view thereof.
Figure 19:
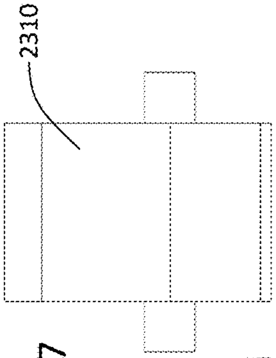
FIG. 19 is a first (or right) side view thereof.
Figure 20:
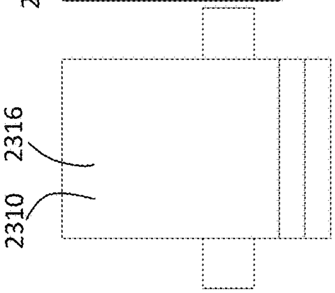
FIG. 20 is a second (or left) side view thereof.
Figure 21:
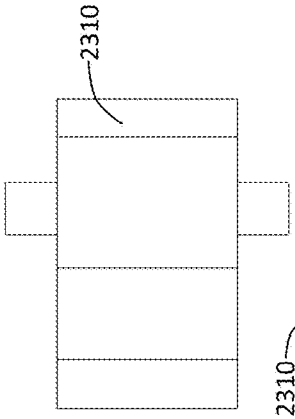
FIG. 21 is a top view thereof.
Figure 22:
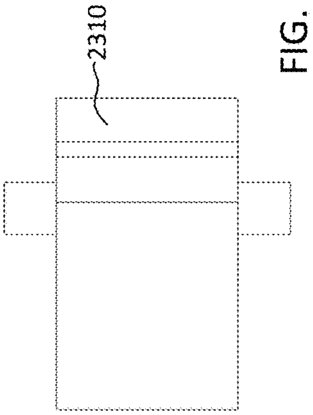
FIG. 22 is a bottom view thereof.

FIG. 15 is a top front perspective view illustrating a bin lug 2310 of the bin 2200 of FIG. 7 in accordance with an embodiment of the application. FIG. 16 is a bottom front perspective view thereof. FIG. 17 is front view thereof. FIG. 18 is rear view thereof. FIG. 19 is a first (or right) side view thereof. FIG. 20 is a second (or left) side view thereof. FIG. 21 is a top view thereof. And, FIG. 14 is a bottom view thereof.

Each bin lug (e.g., 2310) includes: a top side 2311; a bottom side 2312 for receiving an upper surface 8171 of a lifting link pin 8170 of a lifting link 8160 of a double rod actuator assembly (e.g., 8100) as further described below, the bottom side 2312 having a lip or downward projection 2317 formed thereon for retaining the lifting link pin 8170 in place on the bottom side 2312 of the bin lug 2310; a front side 2313 having a front locking pin 2318 formed thereon or attached thereto; a rear side 2314 having a rear locking pin 2319 formed thereon or attached thereto; a downward sloping first (or right) side 2315 for engaging a lower surface 8172 of a lifting link pin 8170 of a double rod actuator assembly 8100; and, a second (or left) side 2316 for attaching to the outer surface 2255 of the first (or right) wall 2250 of a bin 2200 as described above. According to one embodiment, the front and rear locking pins 2318, 2319 may be the ends of a single pin that passes through the bin lug 2310 from the front to rear sides 2313, 2314. The locking pins 2318, 2319 are for engaging the respective locking notches 8168, 8169 of the lifting link 8160 (during upward 301 travel of a bin 2200) and, according to one embodiment, respective locking notches 8188, 8189 of and a lowering link 8180 (during downward travel 302 of a bin 2100) of a double rod actuator assembly 8100 as further described below.

Figure 23:
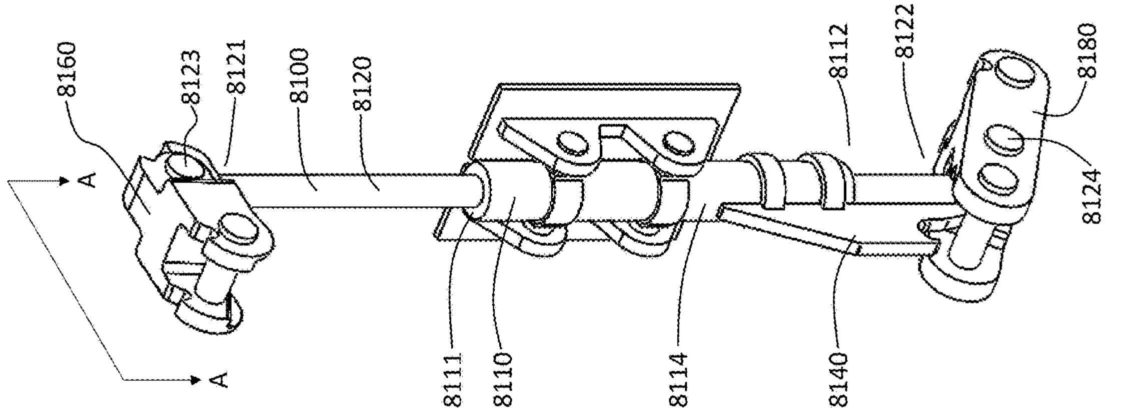
FIG. 23 is a left side perspective view illustrating a double rod actuator assembly in accordance with an embodiment of the application.
Figure 24:
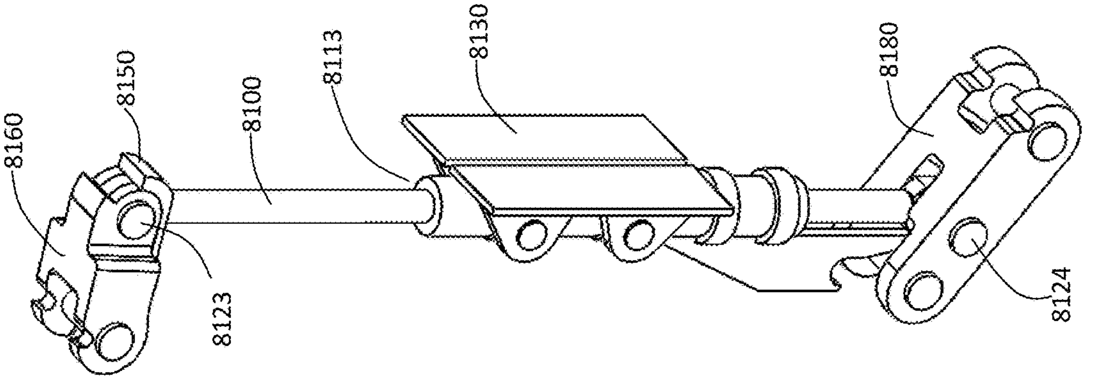
FIG. 24 is a right side perspective view thereof.

FIG. 23 is a left side perspective view illustrating a double rod actuator assembly 8100 in accordance with an embodiment of the application. FIG. 24 is a right side perspective view thereof. FIG. 25 is a bottom left side perspective view illustrating the double rod actuator assembly 8100 of FIG. 23 with the lifting and lowering links 8160, 8180 removed in accordance with an embodiment of the application. FIG. 26 is top left side perspective view thereof. FIG. 27 is a right side perspective view thereof. FIG. 28 is a front view thereof. FIG. 29 is a rear view thereof. FIG. 30 is a right side view thereof. FIG. 31 is a left side view thereof. FIG. 32 is a top view thereof. And, FIG. 33 is a bottom view thereof.

Attached to the second (or left) side 5914 of each cylinder mounting bracket 5910 is a pair 800 of adjacently mounted double rod actuator assemblies 8100, 8200. Each double rod actuator assembly (e.g., 8100) includes: a cylinder barrel 8110 having a first (or top or upper) end 8111 and a second (or bottom or lower) end 8112; a piston rod (or double rod) 8120 passing through the cylinder barrel 8110 from top to bottom ends 8111, 8112 thereof and having a first (or top or upper) end 8121 and a second (or bottom or lower) end 8122; a mounting plate 8130 attached to the first (or right) side 8113 of the cylinder barrel 8110 for mounting the double rod actuator assembly 8100 to the cylinder mounting bracket 5910; a lowering link scroll plate 8140 attached to the second (or left) side 8114 of the cylinder barrel 8110 proximate the bottom end 8112 thereof for controlling movement of the lowering link 8180 as further describe below; a horizontal pivot stop 8150 attached to or formed with the top end 8121 of the piston rod 8120 for controlling movement of the lifting link 8160 as further describe below; a lifting (or raising) link 8160 coupled (e.g., pivotally coupled or attached) to the top end 8121 of the piston rod 8120 by pin, rod, or axle 8123; and, a lowering link 8180 coupled (e.g., pivotally coupled or attached) to the bottom end 8122 of the piston rod 8120 by pin, rod, or axle 8124.

Figures 34, 35, 36, 37, 38, 39, 40, 41, 42:
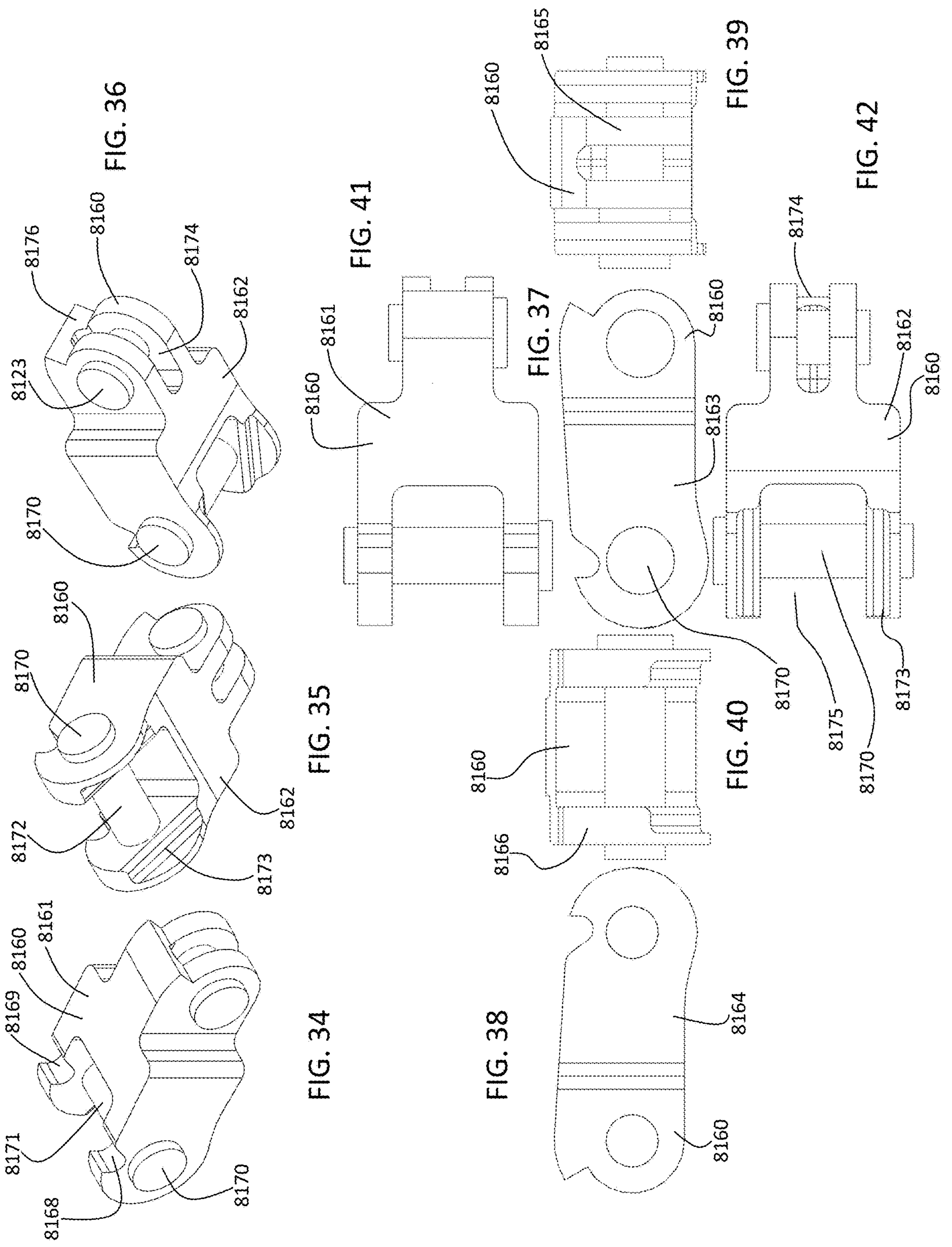
FIG. 34 is a top right side perspective view illustrating a lifting link of the double rod actuator assembly of FIG. 23 in accordance with an embodiment of the application.
FIG. 35 is a bottom left side perspective view thereof.
FIG. 36 is a bottom right side perspective view thereof.
FIG. 37 is a front view thereof.
FIG. 38 is a rear view thereof.
FIG. 39 is a right side view thereof.
FIG. 40 is a left side view thereof.
FIG. 41 is a top view thereof.
FIG. 42 is a bottom view thereof.

FIG. 34 is a top right side perspective view illustrating a lifting link 8160 of the double rod actuator assembly (e.g., 8100) of FIG. 23 in accordance with an embodiment of the application. FIG. 35 is a bottom left side perspective view thereof. FIG. 36 is a bottom right side perspective view thereof. FIG. 37 is a front view thereof. FIG. 38 is a rear view thereof. FIG. 39 is a right side view thereof. FIG. 40 is a left side view thereof. FIG. 41 is a top view thereof. And, FIG. 42 is a bottom view thereof.

Each lifting link (e.g., 8160) includes: a top side 8161 having first and second locking notches 8168, 8169 formed therein for receiving and engaging the respective first and second locking pins 2318, 2319 of bin lugs (e.g., 2310) during upward 301 travel of a bin 2200 and, according to one embodiment as further described below, also during downward travel 302 of a bin 2100; a bottom side 8162 for contacting a front surface 2315 of a bin lug 2310 during downward travel of the upper end 8121 of the piston rod 8120 as further described below, the bottom side 8162 having a recession 8173 formed there for mating with the front surface 2315 of the bin lug 2310 for maintaining alignment as the bottom side 8162 travels over the front surface 2315 of the bin lug 2310 as further described below; a front side 8163 and a rear side 8164, a lifting link pin 8170 mounted between the front and rear sides 8163, 8164; a right side 8165 having a channel (e.g., a C-channel) 8174 formed therein for receiving the upper end 8121 of the piston rod 8120, the upper end 8121 of the piston rod 8120 pivotally coupled attached to the right side 8165 of the lifting link 8160 by a pin 8123 passing from the front side 8163 of the lifting link 8160 through the channel 8174 and an upper eye 8125 of the upper end 8121 of the position rod 8120 and to the rear side 8164 of the lifting link 8160; and, a left side 8166 having a channel (e.g., a C-channel) 8175 formed therein, the lifting link pin 8170 passing from the front side 8163 of the lifting link 8160 through the channel 8175 and to the rear side 8164 of the lifting link 8160. The right side 8165 of the lifting link 8160 has a pivot stop (vertical) 8176 formed thereon for restricting travel of the lifting link 8160 during downward travel of the upper end 8121 of the piston rod 8120 by engaging the horizontal pivot stop 8150 of the upper end 8121 of the piston rod 8120 as further described below.

Figures 43, 44, 45, 46, 47, 48, 49, 50, 51:
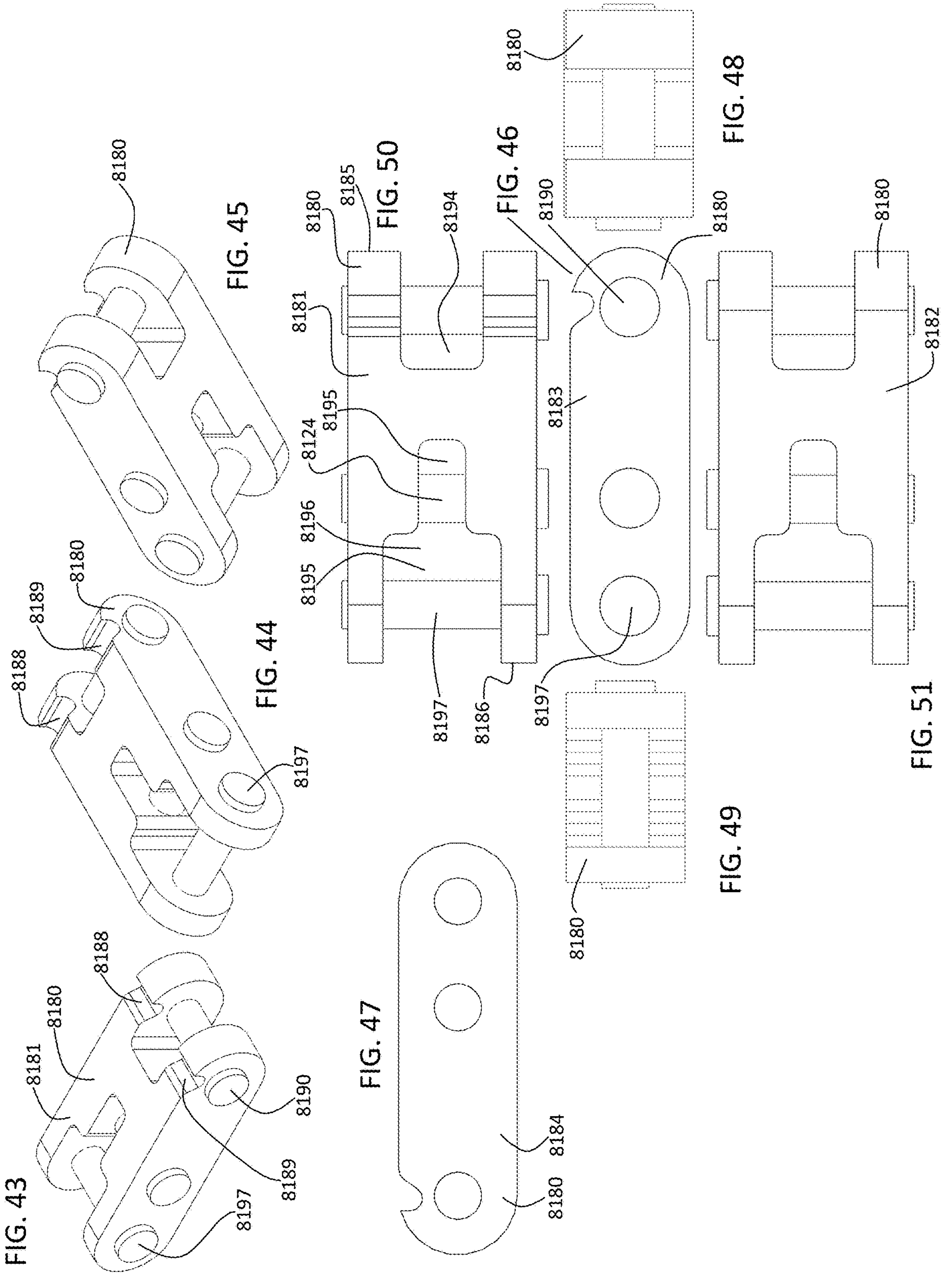
FIG. 43 is a top right side perspective view illustrating a lowering link of the double rod actuator assembly of FIG. 23 in accordance with an embodiment of the application.
FIG. 44 is a top left side perspective view thereof.
FIG. 45 is a bottom right side perspective view thereof.
FIG. 46 is a front view thereof.
FIG. 47 is a rear view thereof.
FIG. 48 is a right side view thereof.
FIG. 49 is a left side view thereof.
FIG. 50 is a top view thereof.
FIG. 51 is a bottom view thereof.

FIG. 43 is a top right side perspective view illustrating a lowering link 8180 of the double rod actuator assembly 8100 of FIG. 23 in accordance with an embodiment of the application. FIG. 44 is a bottom right side perspective view thereof. FIG. 45 is a bottom left side perspective view thereof. FIG. 46 is a front view thereof. FIG. 47 is a rear view thereof. FIG. 48 is a right side view thereof. FIG. 49 is a left side view thereof. FIG. 50 is a top view thereof. And, FIG. 51 is a bottom view thereof.

Each lowering link (e.g., 8180) includes: a top side 8181 having first and second locking notches 8189, 8188 formed therein for receiving and engaging the respective first and second locking pins 2318, 2319 of bin lugs (e.g., 2310) during downward 302 travel of a bin 2100; a bottom side 8182; a front side 8183 and a rear side 8184, a lowering link pin 8190 mounted between the front and rear sides 8183, 8184 proximate the right side 8185, and a scroll plate pin 8197 mounted between the front and rear sides 8183, 8184 proximate the left side 8186; a right side 8185 having a channel (e.g., a C-channel) 8194 formed therein, the lowering link pin 8190 passing from the front side 8183 of the lowering link 8180 through the channel 8194 and to the rear side 8184 of the lowering link 8180; and, a left side 8186 having a channel (e.g., a C-channel) 8195 formed therein for receiving the lower end 8122 of the piston rod 8120, the lower end 8122 of the piston rod 8120 pivotally attached or coupled proximate the left side 8186 of the lower link 8160 by a pin 8124 passing from the front side 8183 of the lowering link 8180 through the channel 8195 and a lower eye 8126 of the lower end 8122 of the position rod 8120 and to the rear side 8184 of the lowering link 8180. The scroll plate pin 8197 passes from the front side 8183 of the lowering link 8160 through the channel 8197 and to the rear side 8184 of the lowering link 8180. The left side channel 8197 has an opening 8196 formed therein between the scroll plate pin 8197 and the lower piston rod pin 8124. The opening 8196 in the lowering link 8180 is for receiving the lower end 8142 of the scroll plate 8140 for moving or rotating the lowering link 8180 between the lowered position 5270 to the raised position 5280 during upward travel of the lower end 8122 of the piston rod 8120 by the scroll plate pin 8197 engaging the upwardly inclined left side 8144 of the scroll plate 8140 proximate its lower end 8142 and travelling up the inclined left side 8144 of the scroll plate 8140 to the scroll plate locking notch 8147 as further described below.

Referring again to FIG. 1, by way of operation of the pair of double rod actuators 8100, 8200, the first (or downward travelling 302) bin 2100 is moveable between at least a first (or higher) position 310, a second (or lower position) 320, and a third (or still lower) position 330 during successive lowering operations. Similarly, the second (or upward travelling 301) bin 2200 is moveable between at least a first (or lower) position 340, a second (or higher position) 350, and a third (or still higher) position 360 during successive lifting operations.

Figure 52:
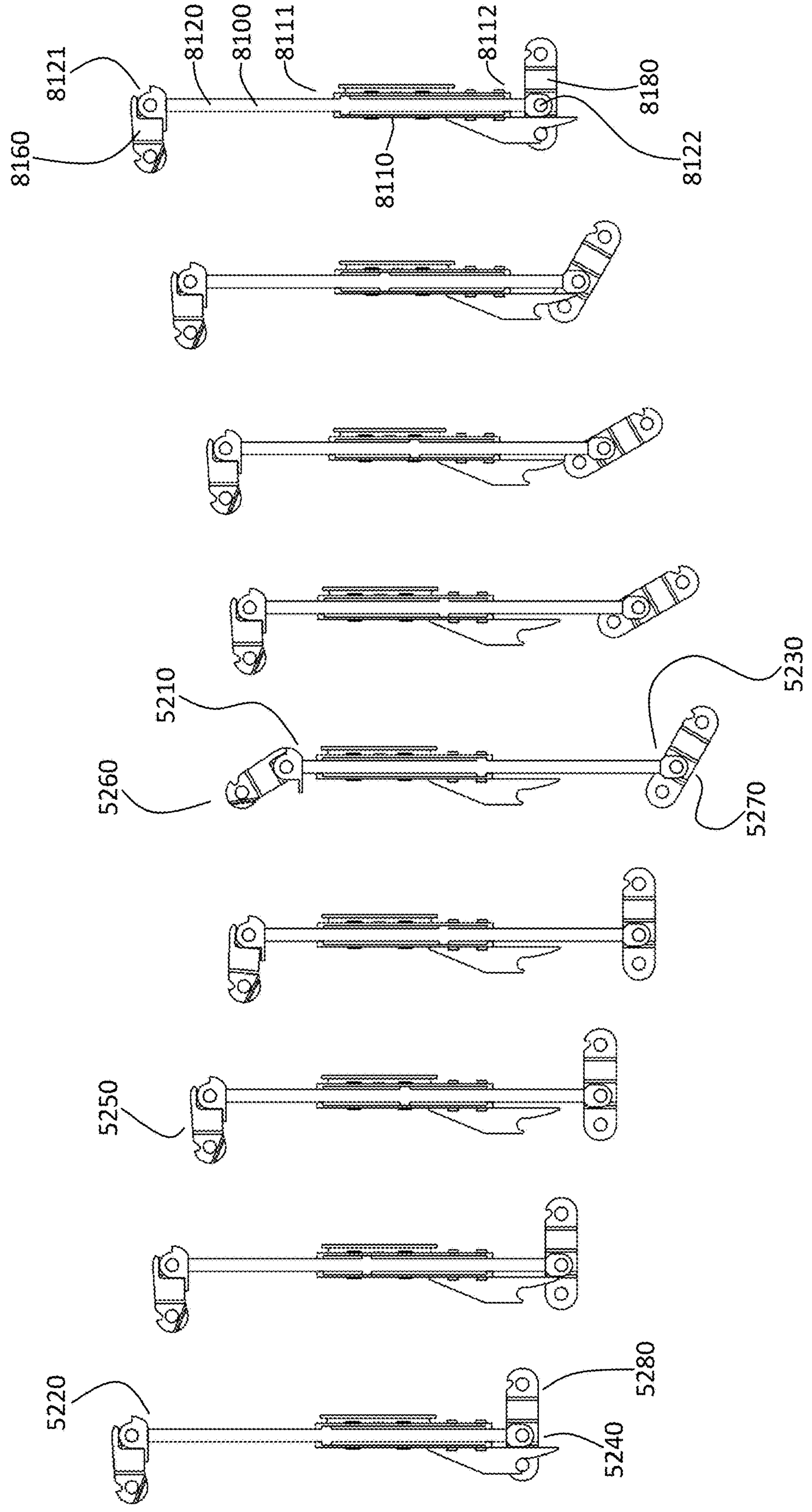
FIG. 52 is a sequence of cross-sectional views taken along line A-A in FIG. 23 illustrating various positions of the double rod actuator assembly, lifting link, and lowering link in accordance with an embodiment of the application.

FIG. 52 is a sequence of cross-sectional views taken along line A-A in FIG. 23 illustrating various positions of a double rod actuator assembly 8100, a lifting link 8160, and a lowering link 8180 in accordance with an embodiment of the application.

The first or upper end 8121 of each piston rod 8120 of each double rod assembly (e.g., 8100) is movable between a retracted position 5210 (i.e., fully retracted into the cylinder barrel 8110 at the top end 8111 thereof) and an extended position 5220 (i.e., fully extended out of the cylinder barrel 8110 at the top end 8111 thereof). Similarly, the second or lower end 8122 of each piston rod 8120 is simultaneously (being the opposite end of the same rod 8120) moveable between an extended position 5230 and a retracted position 5240.

The lifting link 8160 of each double rod assembly 8100 is movable between a first (or lowered) position 5250 and a second (or raised) position 5260. The lowered position 5250 is for engaging a bin lug (e.g., 3210) of a bin 2200 during movement of the top end 8121 of the piston rod 8120 between the retracted position 5210 and the extended position 5220 to thereby move the bin 2200 between, for example, a lower position 340 and a higher position 350 during a lifting operation. The lifting link 8160 moves from the lowered position 5250 to the raised position 5260 when, during movement of the piston rod 8120 between the extended position 5220 and the retracted position 5210 (i.e., after bin 2200 handoff as described further below), the lifting link 8160 comes into contact with the downward sloping first (or right) side 2315 of a bin lug (e.g., 3220). After contact with the bin lug 3220, the lifting link 8160 returns to the lowered position 5250 under the force of gravity (for example) making it ready for its next lifting operation.

The lowering link 8180 of each double rod assembly 8100 is movable between a first (or lowered) position 5270 and a second (or raised) position 5280. The lowered position 5270 is for releasing a bin lug (e.g., 3210) of a bin 2100 during movement of the bottom end 8122 of the piston rod 8120 between the retracted position 5240 and the extended position 5230. The lowering link 8180 releases the bin lug 3210 at the end of a lowering operation wherein the bin 2100 is moved between, for example, a higher position 310 and a lower position 320. The lowering link 8180 moves from the lowered position 5270 to the raised position 5280 when, during movement of the bottom end 8122 of the piston rod 8120 between the extended position 5230 and the retracted position 5240 (i.e., prior to bin 2100 handoff as described further below), the lowering link 8180 comes into contact with and travels up the inclined left side 8144 of the scroll plate 8140 to the scroll plate locking notch 8147 where the lowering link 8180 makes contact with a bin lug 3210 to begin a lowering operation. After the bin lug 3210 is released by the lowering link 8180 after a lowering operation, the lowering link 8180 returns to the lowered position 5270 under the force of gravity (for example) making it ready for its next lifting operation. Note that the lowering link 8180 maintains contact with the bin lug 3210 as the lower end 8122 of the piston rod 8100 moves from the retracted position 5240 to the extended position 5230 during a lowering operation by the weight of the bin 2100.

In operation, the system 100 continuously moves bins 200 in the upward and downward directions 301, 302 in vertical or inclined shafts 300, 400. The bins 200 may be moved in the upward and downward directions 301, 302 simultaneously. For moving bins 200 in the upward direction 301, a lifting link 8160 of a first double rod actuator assembly 8100 engages a first bin lug (e.g., 3210) of a bin 2200 and the actuator assembly 8100 lifts the bin 2200 from a lower position 340 to a higher position 350 (e.g., the lower position 340 plus H2, etc.). Before releasing the bin 2200 at the higher position 350, the bin 2200 is handed off to the lifting link 8160 of a second double rod actuator assembly 8200, that is, the lifting link 8160 of the second double rod actuator assembly 8200 engages a second bin lug (e.g., 2410) of the bin 2200 before the lifting link 8160 of the first double rod actuator assembly 8100 disengages from the first bin lug 3210. This handoff may result in a jogging motion of the bin 2200. The second double rod actuator assembly 8200 then lifts the bin 2200 from the higher position 350 to a still higher position 360 (e.g., the higher position 350 plus H2, etc.). This sequence of lifting operations repeats to move the bin 2200 upward 301 between levels 531, 521, 511 of the shaft 300, 400 to the top 501 of the shaft 300, 400.

Simultaneously, for moving bins 200 in the downward direction 302, a lowering link 8180 of a second double rod actuator assembly 8200 engages a first bin lug (e.g., 4210) of a bin 2100 and the actuator assembly 8200 lowers the bin 2100 from a higher position 310 to a lower position 320 (e.g., the higher position 310 less H2, etc.). Before releasing the bin 2100 at the lower position 320, the bin 2100 is handed off to the lowering link 8180 of a first double rod actuator assembly 8100, that is, the lowering link 8180 of the first double rod actuator assembly 8100 engages a second bin lug (e.g., 3210) of the bin 2100 before the lowering link 8180 of the second double rod actuator assembly 8200 disengages from the first bin lug 4210. This handoff may result in a jogging motion of the bin 2100. The first double rod actuator assembly 8200 then lowers the bin 2100 from the lower position 320 to a still lower position 330 (e.g., the lower position 320 less H2, etc.). This sequence of lowering operations repeats to move the bin 2100 downward 302 between levels 511, 521, 531 of the shaft 300, 400 to the bottom 502 of the shaft 300, 400.

Figure 53:
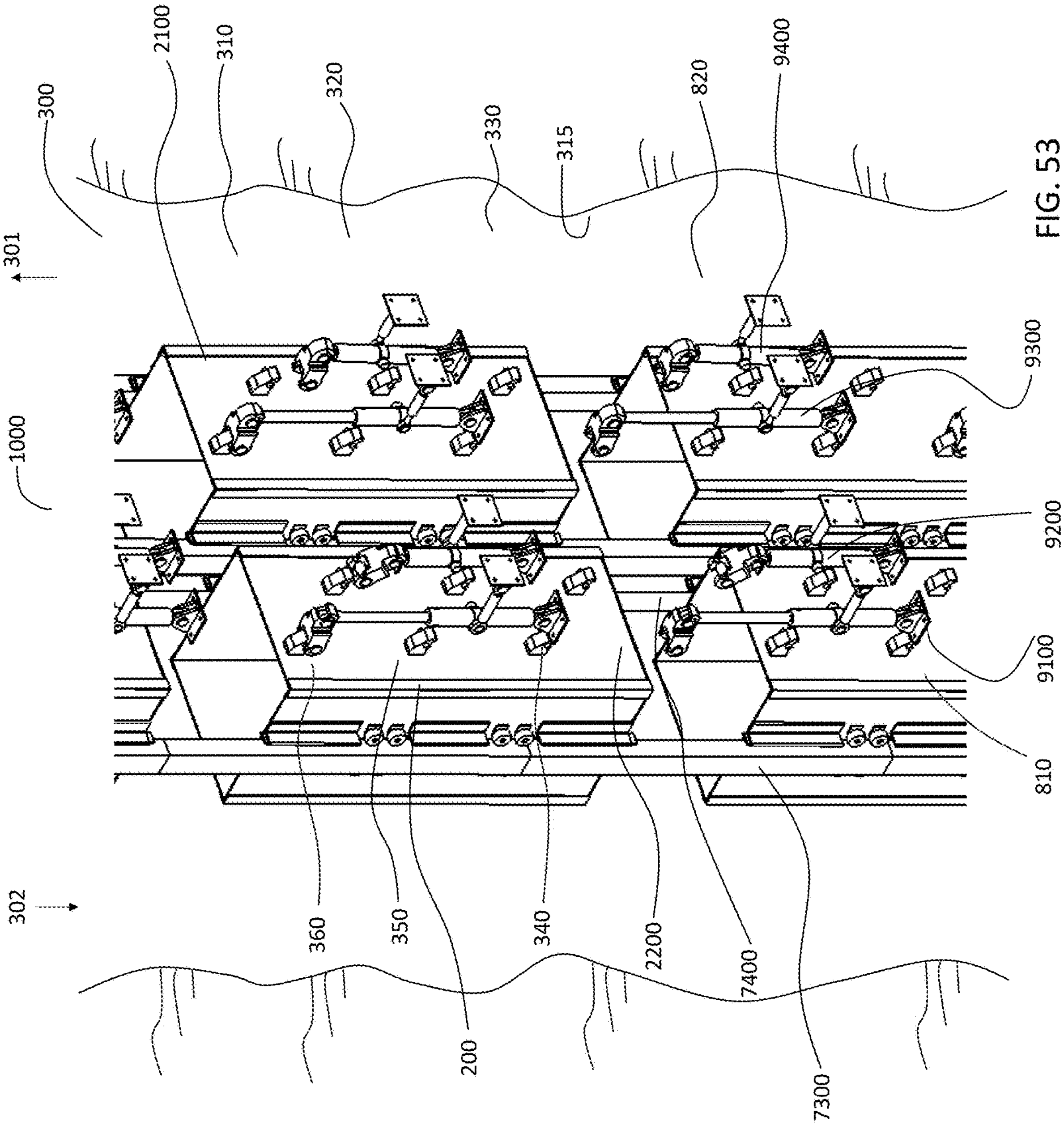
FIG. 53 is a front view illustrating a continuous actuator driven material handling system positioned in a vertical shaft in accordance with another embodiment of the application.
Figure 54:
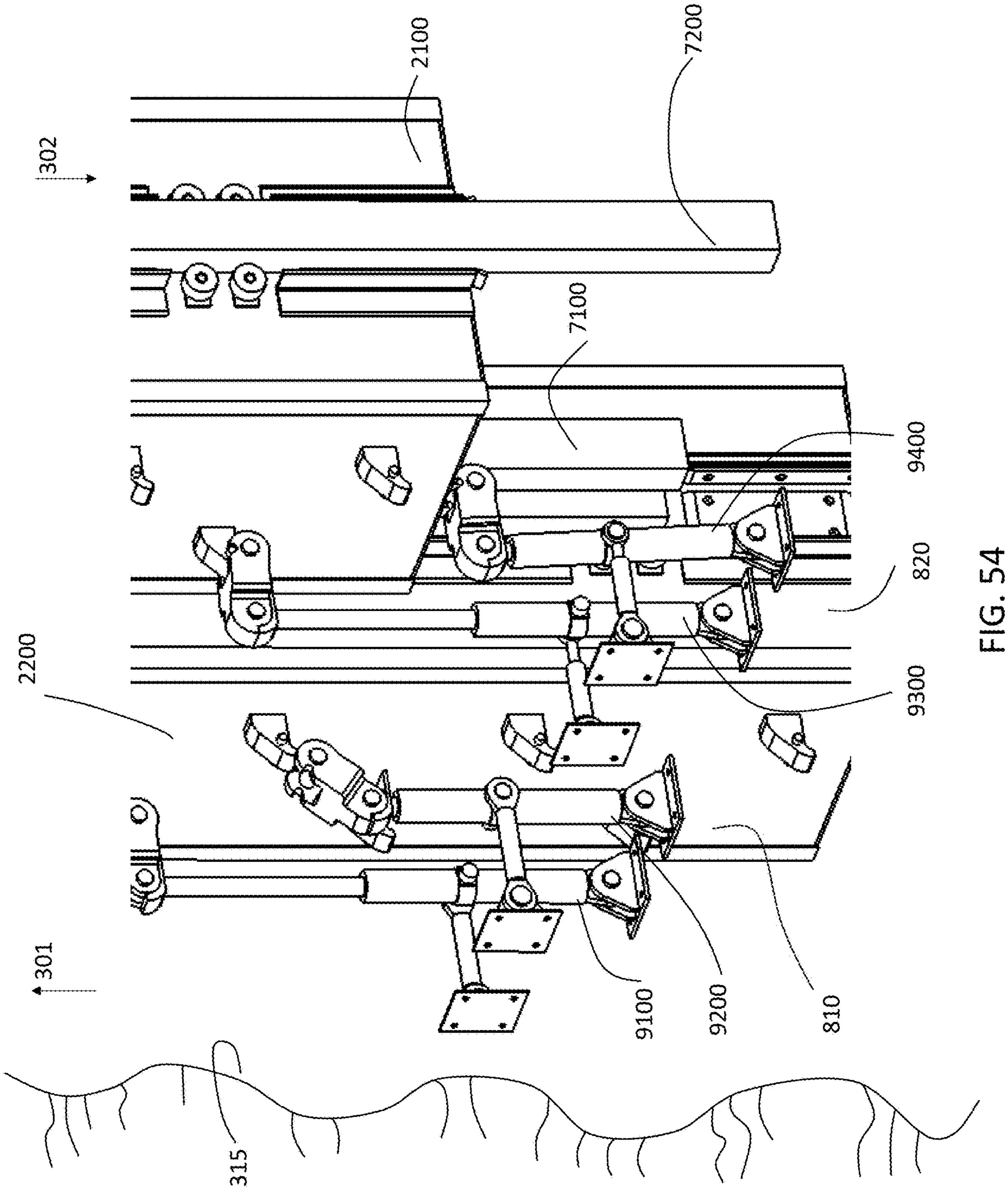
FIG. 54 is a rear perspective detail view illustrating the system of FIG. 53.

FIG. 53 is a front perspective view illustrating a continuous actuator driven material handling system (or "system") 1000 positioned in a vertical shaft 300 in accordance with another embodiment of the application. And, FIG. 54 is a rear perspective detail view illustrating the system 1000 of FIG. 53.

According to another embodiment, rather than using pairs 800 of double rod actuator assemblies 8100, 8200 for raising and lowering bins 200, a first pair 810 of single rod lifting actuator assemblies 9100, 9200 is used for raising bins 200 and a second pair 820 of single rod lowering actuator assemblies 9300, 9400 is used for lowering bins 200. In this second embodiment, the bins 200 are substantially the same as those described above with respect to the first embodiment. However, in the second embodiment, the downward travelling 302 bins (e.g., 2100) and their guides 7100, 7200 are positioned to the rear of the upward travelling 301 bins (e.g., 2200) and their guides 7300, 7400. In addition, the first and second pairs 810, 820 of single rod lifting and lowering actuator assemblies 9100, 9200, 9300, 9400 may be mounted directly to a wall 315 of the shaft 300 and a single bin shaft (e.g., 5980) may be used. Furthermore, the lifting links 8160 perform both as lifting links 8160 and as lowering links 8180, that is, a differently configured lowering link 8180 is not required.

Figures 55, 56, 57, 58, 59, 60, 61, 62:
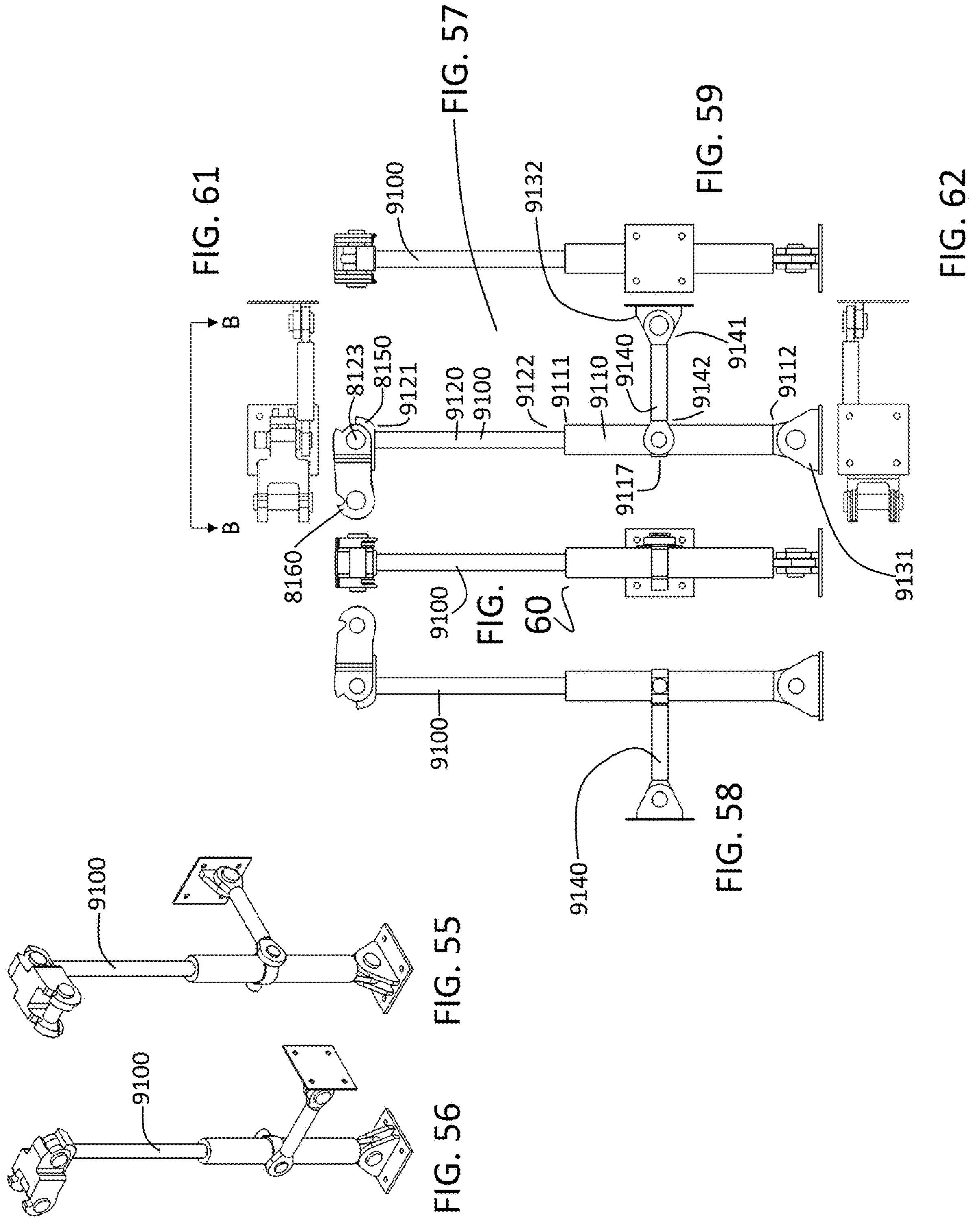
FIG. 55 is a left side perspective view illustrating a single rod lifting actuator assembly in accordance with an embodiment of the application.
FIG. 56 is a right side perspective view thereof.
FIG. 57 is a front view thereof.
FIG. 58 is a rear view thereof.
FIG. 59 is a right side view thereof.
FIG. 60 is a left side view thereof.
FIG. 61 is a top view thereof.
FIG. 62 is a bottom view thereof.

FIG. 55 is a left side perspective view illustrating a single rod lifting actuator assembly 9300 in accordance with an embodiment of the application. FIG. 56 is a right side perspective view thereof. FIG. 57 is a front view thereof. FIG. 58 is a rear view thereof. FIG. 59 is a right side view thereof. FIG. 60 is a left side view thereof. FIG. 61 is a top view thereof. And, FIG. 62 is a bottom view thereof.

Each single rod lifting actuator assembly (e.g., 9100) includes: a cylinder barrel 9110 having a first (or top or upper) end 9111 and a second (or bottom or lower) end 9112; a piston rod 9120 passing into the cylinder barrel 9110 from top to bottom ends 9111, 9112 thereof and having a first (or top or upper) end 9121 and a second (or bottom or lower) end 8122; a vertical mounting bracket 9131 rotatably or pivotally attached (e.g., by pin, etc.) to the bottom end 9112 of the cylinder barrel 9110 for mounting the single rod lifting actuator assembly 9100 to the wall 315 of the shaft 300 (e.g., via a girder 5400, etc.); a horizontal support 9140 having a first (or right) end 9141 and a second (of left) end 9142, the horizontal support 9140 rotatably or pivotally attached (e.g., by pin, etc.) at the second end 9142 to the cylinder barrel 9110 proximate a midpoint 9117 thereof; a vertical mounting bracket 9132 rotatably or pivotally attached (e.g., by pin, etc.) to the right end 9141 of the horizontal support 9140 for mounting the single rod lifting actuator assembly 9100 to the wall 315 of the shaft 300 and providing additional support thereto; a horizontal pivot stop 8150 attached to or formed with the top end 9121 of the piston rod 9120 for controlling movement of the lifting link 8160 as described above; and, a lifting (or raising) link 8160 coupled to the top end 9121 of the piston rod 9120 by pin, rod, or axle 8123.

Figures 63, 64, 65, 66, 67, 68, 69, 70:
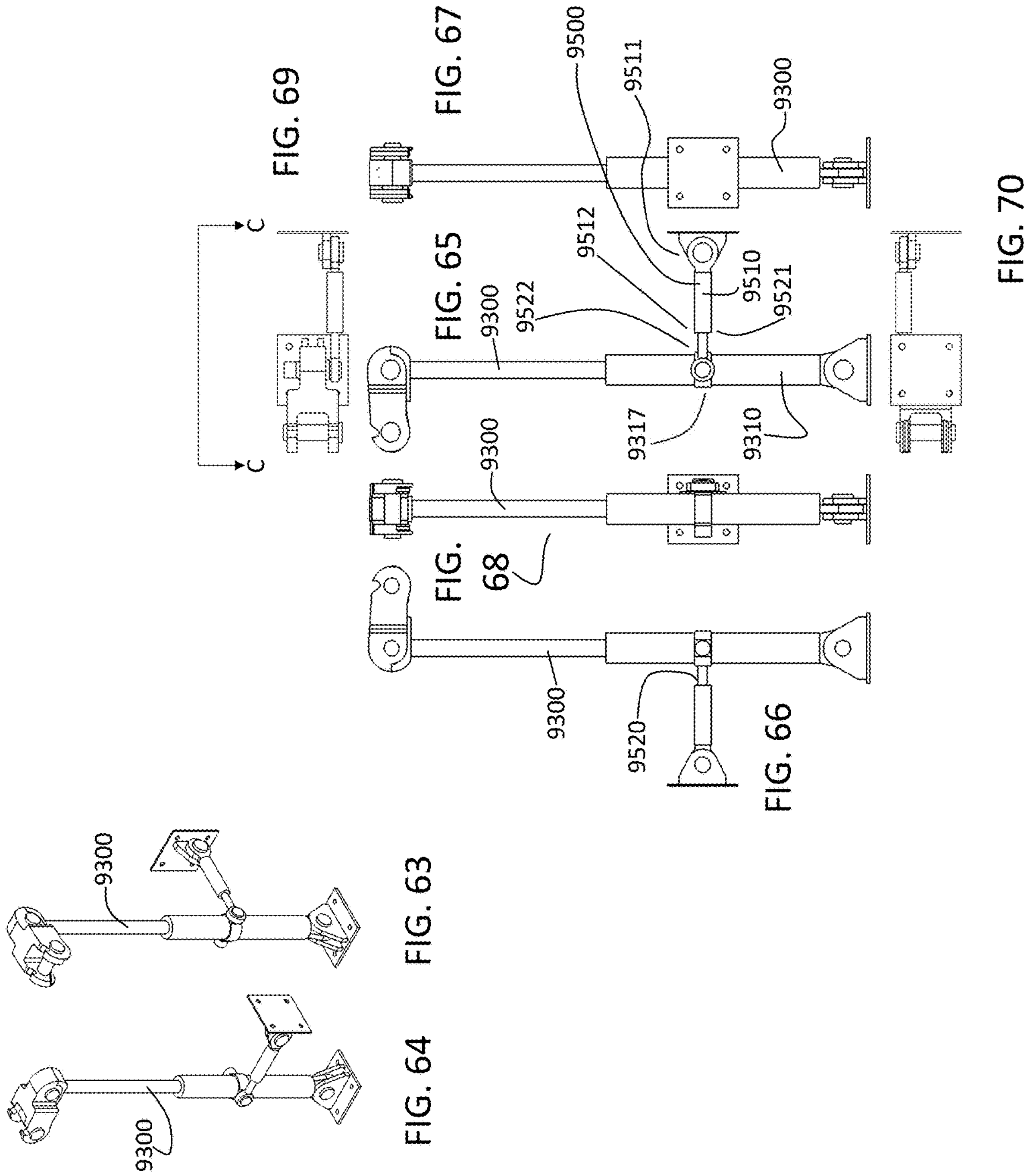
FIG. 63 is a left side perspective view illustrating a single rod lowering actuator assembly in accordance with an embodiment of the application.
FIG. 64 is a right side perspective view thereof.
FIG. 65 is a front view thereof.
FIG. 66 is a rear view thereof.
FIG. 67 is a right side view thereof.
FIG. 68 is a left side view thereof.
FIG. 69 is a top view thereof.
FIG. 70 is a bottom view thereof.

FIG. 63 is a left side perspective view illustrating a single rod lowering actuator assembly 9300 in accordance with an embodiment of the application. FIG. 64 is a right side perspective view thereof. FIG. 65 is a front view thereof. FIG. 66 is a rear view thereof. FIG. 67 is a right side view thereof. FIG. 68 is a left side view thereof. FIG. 69 is a top view thereof. And, FIG. 70 is a bottom view thereof.

Each single rod lowering actuator assembly (e.g., 9300) includes the same components as the single rod lifting assembly 9100 except the single rod lowering actuator assembly 9300 includes a horizontal actuator 9500 instead of a horizontal support 9140. The horizontal actuator 9500 has a cylinder barrel 9510 having a first (or right) end 9511 and a second (or left) end 9512; a piston rod 9520 passing into the cylinder barrel 9510 from left to right ends 9512, 9511 thereof and having a first (or right) end 9521 and a second (or left) end 9522, the left piston rod end 9522 rotatably or pivotally attached (e.g., by pin, etc.) to the cylinder barrel 9510 proximate a midpoint 9317 thereof; and, a vertical mounting bracket 9132 rotatably or pivotally attached (e.g., by pin, etc.) to the right end 9511 of the cylinder barrel 9510 for mounting the single rod lowering actuator assembly 9300 to the wall 315 of the shaft 300 and providing additional support thereto.

Referring again to FIG. 1, by way of operation of the pairs 810, 820 of single rod lifting actuator assemblies 9100, 9200 and single rod lowering actuator assemblies 9300, 9400, the first (or downward travelling 301) bin 2100 is moveable between at least a first (or higher) position 310, a second (or lower position) 320, and a third (or still lower) position 330 during successive lowering operations. Similarly, the second (or upward travelling 302) bin 2200 is moveable between at least a first (or lower) position 340, a second (or higher position) 350, and a third (or still higher) position 360 during successive lifting operations.

Figure 71:
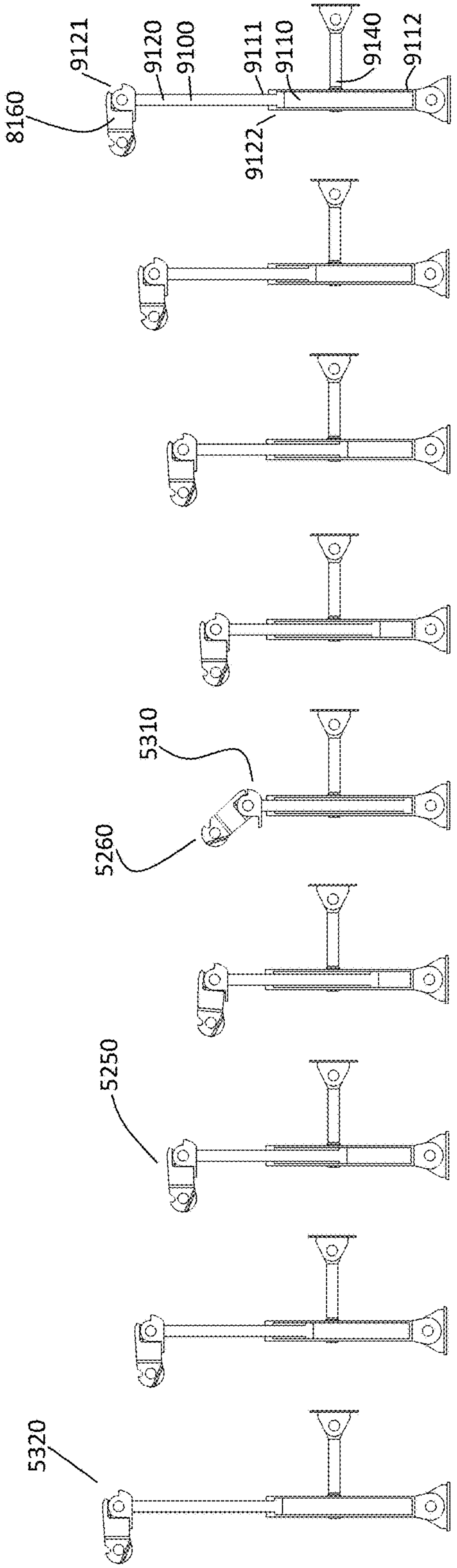
FIG. 71 is a sequence of cross-sectional views taken along line B-B in FIG. 61 illustrating various positions of a single rod lifting actuator assembly and lifting link in accordance with an embodiment of the application.

FIG. 71 is a sequence of cross-sectional views taken along line B-B in FIG. 61 illustrating various positions of a single rod lifting actuator assembly 9100 and lifting link 8160 in accordance with an embodiment of the application.

The first or upper end 9121 of each piston rod 9120 of each single rod lifting assembly (e.g., 9100) is movable between a retracted position 5310 (i.e., fully retracted into the cylinder barrel 9110 at the top end 9111 thereof) and an extended position 5320 (i.e., fully extended out of the cylinder barrel 9110 at the top end 9111 thereof).

The lifting link 8160 of each single rod lifting assembly 9100 is movable between a first (or lowered) position 5250 and a second (or raised) position 5260. The lowered position 5250 is for engaging a bin lug (e.g., 3210) of a bin 2200 during movement of the top end 9121 of the piston rod 9120 between the retracted position 5310 and the extended position 5320 to thereby move the bin 2200 between, for example, a lower position 340 and a higher position 350 during a lifting operation. The lifting link 8160 moves from the lowered position 5250 to the raised position 5260 when, during movement of the piston rod 9120 between the extended position 5320 and the retracted position 5310 (i.e., after bin 2200 handoff as described further below), the lifting link 8160 comes into contact with the downward sloping first (or right) side 2315 of a bin lug (e.g., 3220). After contact with the bin lug 3220, the lifting link 8160 returns to the lowered position 5250 under the force of gravity (for example) making it ready for its next lifting operation.

Figure 72:
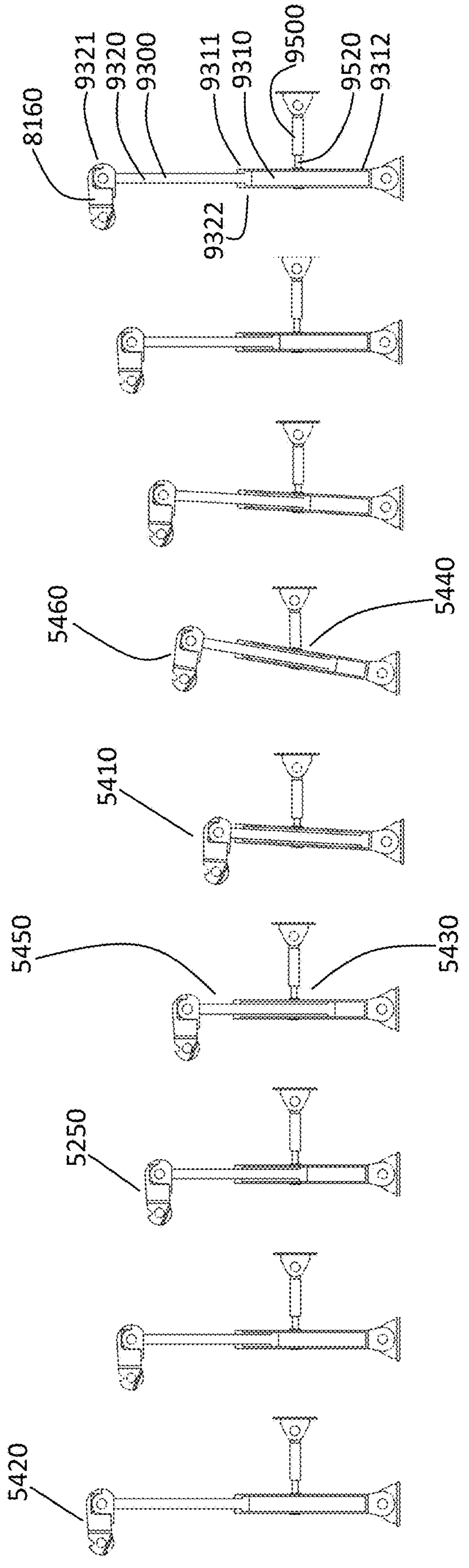
FIG. 72 is a sequence of cross-sectional views taken along line C-C in FIG. 69 illustrating various positions of a single rod lowering actuator assembly, lowering link, and horizonal actuator in accordance with an embodiment of the application; and,
FIG. 73 is a front view illustrating a continuous actuator driven material handling system positioned in an inclined shaft in accordance with an embodiment of the application.

FIG. 72 is a sequence of cross-sectional views taken along line C-C in FIG. 69 illustrating various positions of a single rod lowering actuator assembly 9300, lowering link 8160, and horizonal actuator 9150 in accordance with an embodiment of the application.

The first or upper end 9321 of each piston rod 9320 of each single rod lowering assembly (e.g., 9300) is movable between a retracted position 5410 (i.e., fully retracted into the cylinder barrel 9310 at the top end 9311 thereof) and an extended position 5420 (i.e., fully extended out of the cylinder barrel 9310 at the top end 9311 thereof).

The second or left end 9522 of each piston rod 9520 of each horizontal actuator (e.g., 9500) is movable between an extended position 5430 (i.e., fully extended out of the cylinder barrel 9510 at the left end 9512 thereof) and a retracted position 5440 (i.e., fully retracted into the cylinder barrel 9510 at the left end 9512 thereof).

When moving between the extended position 5430 and the retracted position 5440, the cylinder rod 9520 moves the cylinder barrel 9310 of the single cylinder lowering actuator assembly 9300 between a vertical position 5450 and an inclined position 5460 (i.e., inclined away from a bin lug 3210 of a bin 2100) to thereby allow the lowering link (being the same as the lifting link) 8160 to pass over the bin lug 3210 prior to and in preparation for a lowering operation.

The lifting link 8160 of each single rod lowering assembly 9300 typically remains in the lowered position 5250 during lowering operations.

The lowered position 5250 of the lifting link 8160 of each single rod lowering assembly 9300 is for engaging a bin lug (e.g., 3210) of a bin 2100 during movement of the top end 9321 of the piston rod 9320 between the extended position 5420 and the retracted position 5430 to thereby move the bin 2100 between, for example, a higher position 310 and a lower position 320 during a lowering operation. The cylinder barrel 9310 (and lowering link 8160) moves from the vertical position 5450 to the inclined position 5460 by way of operation of the horizontal actuator 9500, during movement of the piston rod 9320 between the extended position 5420 and the retracted position 5410 (i.e., after bin 2100 handoff as described further below), to pass the lowering link 8160 over the bin lug (e.g., 3210). After passing over the bin lug 3210, the lowering link 8160 and cylinder barrel 9310 return to the vertical position 5450 by way of operation of the horizontal actuator 9500 making them ready for their next lowering operation.

In operation, the system 1000 continuously moves bins 200 in the upward and downward directions 301, 302 in vertical or inclined shafts 300, 400. The bins 200 may be moved in the upward and downward directions 301, 302 simultaneously or independently. For moving bins 200 in the upward direction 301, a lifting link 8160 of a first single rod lifting actuator assembly 9100 engages a first bin lug (e.g., 3210) of a bin 2200 and the actuator assembly 9100 lifts the bin 2200 from a lower position 340 to a higher position 350 (e.g., the lower position 340 plus H2, etc.). Before releasing the bin 2200 at the higher position 350, the bin 2200 is handed off to the lifting link 8160 of a second single rod lifting actuator assembly 9200, that is, the lifting link 8160 of the second single rod lifting actuator assembly 9200 engages a second bin lug (e.g., 2410) of the bin 2200 before the lifting link 8160 of the first single rod lifting actuator assembly 9100 disengages from the first bin lug 3210. This handoff may result in a jogging motion of the bin 2200. The second single rod lifting actuator assembly 9200 then lifts the bin 2200 from the higher position 350 to a still higher position 360 (e.g., the higher position 350 plus H2, etc.). This sequence of lifting operations repeats to move the bin 2200 upward 301 between levels 531, 521, 511 of the shaft 300, 400 to the top 501 of the shaft 300, 400.

Simultaneously or independently, for moving bins 200 in the downward direction 302, a lowering link (being the same as a lifting link in this embodiment) 8160 of a first single rod lowering actuator assembly 9300 engages a first bin lug (e. g., 3210) of a bin 2100 and the actuator assembly 9300 lowers the bin 2100 from a higher position 310 to a lower position 320 (e.g., the higher position 310 less H2, etc.). Before releasing the bin 2100 at the lower position 320, the bin 2100 is handed off to the lowering link 8160 of a second single rod lowering actuator assembly 9400, that is, the lowering link 8160 of the second single rod lowering actuator assembly 9400 engages a second bin lug (e.g., 4210) of the bin 2100 before the lowering link 8160 of the first single rod lowering actuator assembly 9300 disengages from the first bin lug 3210. This handoff may result in a jogging motion of the bin 2100. The second single rod lowering actuator assembly 8200 then lowers the bin 2100 from the lower position 320 to a still lower position 330 (e.g., the lower position 320 less H2, etc.). This sequence of lowering operations repeats to move the bin 2100 downward 302 between levels 511, 521, 531 of the shaft 300, 400 to the bottom 502 of the shaft 300, 400.

According to one embodiment, the actuator assemblies 8100, 8200, 9100, 9200, 9300, 9400 may be operable simultaneously. According to another embodiment, the actuator assemblies 8100, 8200, 9100, 9200, 9300, 9400 may be operable independently. According to one embodiment, the actuator assemblies 8100, 8200, 9100, 9200, 9300, 9400 may be operate automatically. According to another embodiment, the actuator assemblies 8100, 8200, 9100, 9200, 9300, 9400 may be operate under the control of a control system 10000.

According to one embodiment, a pair (e.g., 810) of actuator assemblies (e.g., 9100, 9200) is located at each level (e.g., 511, 521, 523) of the shaft 300, 400. According to another embodiment, the actuator assemblies (e.g., 9100, 9200) of a pair (e.g., 810) are separated and are located on adjacent or different levels (e.g., 511, 521) of the shaft 300, 400.

According to one embodiment, a control system 10000 is provided in the shaft 300, 400 for local control and monitoring of the continuous material handling system 100, 1000 and its components (e.g., actuators 8100, 8200, 9100, 9200, 9300, 9400, etc.). According to another embodiment, the control system 10000 may be remotely located (e.g., on the surface of a mine, etc.) and may be communicatively coupled to the continuous material handling system 100, 1000 and its components over a wired or wireless communications network (e.g., cellular, WIFI, LAN, WLAN, etc.) 10010 for remote control and monitoring of the continuous material handling system 100, 1000 and its components. The control system 10000 may include one or more local or remote user interfaces, input devices, and output devices (e.g., keyboards, control panels, displays, touchscreens, graphical user interfaces, joy sticks, mice, printers, buttons, etc.) for receiving commands from an operator and for presenting information (e. g., status indications, measured values, alarms, etc.) to the operator. The control system 10000 may include software modules stored in memory for local control, maintenance, installation, commissioning, and for integration into surface control for remote operation. Advantageously, the control system 10000 allows for controlling the continuous material handling system 100, 1000 and its components by an operator from a location distant from the shaft 300, 400 and even from a location distant from the mine itself such as at the surface. As such, the operator need not venture near the shaft 300, 400 during mining or material handling operations.

Thus, according to one embodiment, there is provided a continuous actuator driven material handling system 1000 for vertical and inclined shafts 300, 400, comprising: a first pair 810 of actuator assemblies 9100, 9200, each of the first pair 810 of actuator assemblies 9100, 9200 configured to alternately raise a first bin 2200 by an increment (e.g., H2, position 350 less position 340, etc.) a first actuator assembly 9100 of the first pair 810 raising the first bin 2200 by the increment before handing the first bin 2200 off to a second actuator assembly 9200 of the first pair 810, the second actuator assembly 9200 of the first pair 810 raising the first bin 2200 by the increment before handing the first bin 2200 back to the first actuator assembly 9100 of the first pair 810;

a second pair 820 of actuators assemblies 9300, 9400, each of the second pair 820 of actuator assemblies 9300, 9400 configured to alternately lower a second bin 2100 by the increment (e.g., H2, position 310 less position 320, etc.), a first actuator assembly 9300 of the second pair 820 lowering the second bin 2100 by the increment before handing the second bin 2100 off to a second actuator assembly 9400 of the second pair 820, the second actuator assembly 9400 of the second pair 820 lowering the second bin 2100 by the increment before handing the second bin 2100 back to the first actuator assembly 9300 of the second pair 8200; a further plurality of first pairs 810 of actuator assemblies 9100, 9200 mounted on a wall 315 of the shaft 300, 400 to thereby successively raise the first bin 2200 up 301 the shaft 300, 400; and, a further plurality of second pairs 820 of actuators assemblies 9300, 9400 mounted on the wall 315 of the shaft 300, 400 to thereby successively lower the second bin 2100 down 302 the shaft 300, 400.

The above embodiments may contribute to an improved continuous material handling system 100, 1000 for vertical and inclined shafts and may provide one or more advantages. First, the system 100, 1000 provides for virtually unlimited single lift hoisting depth as compared to current mine production hoisting systems which can only operate to a finite single lift hoisting depth. Second, the hoisting capacity of a single system 100, 1000 is much improved (e.g., by orders of magnitude) over current systems. Third, the system 100, 1000 provides for continuous hoisting operations as compared to the typical batch operations of current systems, as such, the depth of hoist has little or no impact on production rates.

Fourth, the system 100, 1000 has a small footprint, both on the surface and in the shaft 300, 400. Fifth, the system 100, 1000 provides for high production capacity out of much smaller shafts 300, 400 with minimal surface infrastructure. Sixth, the system 100, 1000 provides improved flexibility. By simply altering the bin density (i.e., adding or removing bins 200 in the circuit), production rates may be increased or decreased by up to orders of magnitude without an impact on system design or functionality. Also, system hoisting depth may be extended without any engineering, design changes, or impacts to production capability, by simply deepening the shaft 300, 400 and extending the existing system 100, 1000. Seventh, the system 100, 1000 is operable in inclined shafts 400 unlike current systems. The system 100, 1000 may be installed in an inclined shaft 400 to follow plunging ore bodies and to stay at a constant distance from the ore body. Also, the shafts will typically not have to be constructed to the very rigorous and exacting tolerances required by conventional hoisting plants. And eighth, front end construction time and capital may be significantly reduced as the system 100, 1000 requires minimal frontend engineering (i.e., it is a pre-engineered system), and as such, no long lead time hoist deliveries, installation, or heads frame construction.

The embodiments of the application described above are intended to be exemplary only. Those skilled in this art will understand that various modifications of detail may be made to these embodiments, all of which come within the scope of the application.

What is claimed is:

1. A continuous material handling system, comprising:

a plurality of bins, each bin having a plurality of bin lugs mounted on a wall of the bin, first and second bin lugs being vertically spaced on the wall of the bin;

a first actuator assembly having a first rod, the first actuator operable to move an upper end of the first rod between a first retracted position and a first extended position, a first lifting link being pivotally attached to the upper end of the first rod, the first lifting link configured to engage one of the bin lugs; and, a second actuator assembly having a second rod, the second actuator operable to move an upper end of the second rod between a second retracted position and a second extended position, a second lifting link being pivotally attached to the upper end of the second rod, the second lifting link configured to engage another one of the bin lugs;

wherein the first lifting link engages the first bin lug and the first actuator assembly moves the bin from a first lower position to a second higher position when the upper end of first rod moves between the first retracted and first extended positions;

wherein the second lifting link engages the second bin lug and the second actuator moves the bin from the second higher position to a third still higher position when the upper end of the second rod moves between the second retracted position and the second extended position; and, wherein the first lifting link disengages from the first bin lug after the second lifting link engages the second bin lug.

2. The continuous material handling system of claim 1, further comprising:

a third actuator assembly having a third rod, the third actuator operable to move an upper end of the third rod between a third extended position and a third retracted position, a third lowering link being pivotally attached to the upper end of the third rod, the third lowering link configured to engage one of the bin lugs; and, a fourth actuator assembly having a fourth rod, the fourth actuator operable to move an upper end of the fourth rod between a fourth extended position and a fourth retracted position, a fourth lowering link being pivotally attached to the upper end of the fourth rod, the fourth lowering link configured to engage another one of the bin lugs;

wherein the third lowering link engages the second bin lug and the third actuator assembly moves the bin from a first higher position to a second lower position when the upper end of third rod moves between the third extended position and the third retracted position;

wherein the fourth lowering link engages the first bin lug and the fourth actuator assembly moves the bin from the second lower position to a third still lower position when the upper end of the fourth rod moves between the fourth extended position and the fourth retracted position; and, wherein the third lowering link disengages from the second bin lug after the fourth lowering link engages the first bin lug.

3. The continuous material handling system of claim 2, wherein the first, second, third, and fourth actuator assemblies are mounted to a wall of a shaft.

4. The continuous material handing system of claim 3, wherein the shaft is one of a vertical shaft and an inclined shaft.

5. The continuous material handing system of claim 4, wherein the shaft is for accessing an underground mine.

6. The continuous material handling system of claim 3, wherein the continuous material handling system includes a plurality of sets of the first, second, third, and fourth actuator assemblies to continuously move the bins in upward and downward directions in a shaft.

7. The continuous material handling system of claim 6, wherein the sets are installed at respective levels of the shaft.

8. The continuous material handling system of claim 1, wherein the bins are for transporting material, muck, or ore.

9. The continuous material handling system of claim 1, further comprising a control system for controlling and monitoring components of the continuous material handling system.

10. The continuous material handling system of claim 1, wherein the first, second, third, and fourth actuator assemblies include one of hydraulic cylinders, pneumatic actuators, and electric actuators.

11. The continuous material handling system of claim 2, wherein the first and second lifting links and the third and fourth lowering links have a same configuration.

12. The continuous material handling system of claim 1, wherein each bin is travelling in an upward direction.

13. The continuous material handling system of claim 2, wherein each bin is travelling in a downward direction.

* * * * *